(12) United States Patent
Abu-Taleb et al.

(10) Patent No.: US 12,049,335 B2
(45) Date of Patent: *Jul. 30, 2024

(54) STORAGE AND/OR TRANSPORTATION OF PRODUCE, FLOWERS AND PLANTS

(71) Applicant: CAMBRIDGE CROPS, INC., Boston, MA (US)

(72) Inventors: Laith Abu-Taleb, Washington, DC (US); Adam Behrens, Charlestown, MA (US); Christina Belsito, Boston, MA (US); Megan Biango-Daniels, Boston, MA (US); Lester Cheuk-Yin Chong, Somerville, MA (US); Kelly Richmond, Boston, MA (US); Sezin Yigit, Arlington, MA (US)

(73) Assignee: CAMBRIDGE CROPS, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,496

(22) Filed: Dec. 6, 2022

(65) Prior Publication Data

US 2023/0106041 A1 Apr. 6, 2023

Related U.S. Application Data

(63) Continuation of application No. 17/372,317, filed on Jul. 9, 2021, now Pat. No. 11,548,669.

(60) Provisional application No. 63/049,973, filed on Jul. 9, 2020.

(51) Int. Cl.
*B65B 25/04* (2006.01)
*B65D 85/50* (2006.01)

(52) U.S. Cl.
CPC .......... *B65B 25/041* (2013.01); *B65D 85/505* (2013.01)

(58) Field of Classification Search
CPC ....... B65B 25/04; B65B 25/041; B65D 85/50; B65D 85/505
See application file for complete search history.

(56) References Cited

U.S. PATENT DOCUMENTS

| 3,973,355 | A | 8/1976 | McKenzi | |
| 11,498,743 | B2 * | 11/2022 | Gomez | B65D 81/28 |
| 2009/0260281 | A1 | 10/2009 | Conrad | |
| 2016/0081285 | A1 | 3/2016 | DeBlock | |
| 2017/0043889 | A1 * | 2/2017 | Jin | A23B 7/154 |
| 2020/0178576 | A1 † | 6/2020 | Behrens | |

FOREIGN PATENT DOCUMENTS

| JP | 2010254596 A | † 11/2010 |
| WO | 2015134865 A1 | † 9/2015 |

* cited by examiner
† cited by third party

*Primary Examiner* — Bryon P Gehman
(74) *Attorney, Agent, or Firm* — Carla Mouta-Bellum; Arrigo, Lee, Guttman & Mouta-Bellum, LLP

(57) ABSTRACT

Provided are methods and compositions for improving storage and/or transportation of food, flowers, plants, or the like by coating of the same with silk proteins or other substances including silk fibroin, chitin, acetylated monoglycerides, shellac, starch, high fructose corn syrup, mayauba wax, maydelilla wax, beeswax, vegetable oil, paraffin oil, ethylenediaminetetraacetic acid, cellulose, pectin, alginate, chitosan, gum Arabic, soy protein, zein, casein, and/or whey.

29 Claims, 18 Drawing Sheets
(11 of 18 Drawing Sheet(s) Filed in Color)

| WILTING SEVERITY | |
|---|---|
| 1 | No Wilt |
| 2 | Slightly Wilted |
| 3 | Moderately Wilted |
| 4 | Completely Wilted |

No. 1     No. 2     No. 3     No. 4

| ROT | |
|---|---|
| 1 | 0-10% of tote surface |
| 2 | 10-30% of tote surface |
| 3 | 30-50% of tote surface |
| 4 | >50% of tote surface |

FIG. 3

Transit Study Day 1 – Top Layer

STORAGE AND/OR TRANSPORTATION OF PRODUCE, FLOWERS AND PLANTS

CROSS-REFERENCE TO RELATED APPLICATIONS

This application claims the benefit of U.S. application Ser. No. 17/372,317, filed Jul. 9, 2021, which claims priority to U.S. Provisional Application No. 63/049,973, filed Jul. 9, 2020, both of which are incorporated herein by reference in their entireties.

FIELD

The disclosure relates to methods and compositions for improving storage and/or transportation of food, flowers, plants, or the like.

BACKGROUND

Each year, millions of dollars of food, flowers, plants, or the like are lost to damage during transportation from harvest to consumers. Post-harvest preservation of foods and plants, particularly produce, flowers, and plants poses major technical challenges due to the fragile nature of the products and their susceptibility to changes in temperature, humidity, light, atmosphere, and other environmental factors. There is an unmet need for methods that allow for the maximization of the storage volume in warehouses, stores, and within trucks and other systems that transport food, flowers, plants, or the like from harvest to the point of sale and consumers in an economically feasible and environmentally conscientious strategy.

SUMMARY

The presently described technology and its advantages will be better understood by reference to the following embodiments, aspects, and examples. These examples are provided to describe specific embodiments of the present technology. Those with ordinary skill in the art will appreciate that various modifications and alternatives could be developed in light of the overall teachings of the disclosure. Accordingly, the particular arrangements and examples disclosed are meant to be illustrative only and not limiting as to the scope of the invention, which is to be given the full breadth of the appended claims, and any and all equivalents thereof.

The disclosure provides methods and compositions that improve the post-harvest preservation of food for human consumption (e.g., edible protein, processed food, meat, fish, shellfish, produce, vegetables, fruits, or the like), food for animal consumption (e.g., pet food, animal feed, or the like), flowers, plants, seeds, nuts, or the like (herein referred to as the "product") and maximize the capacity of transport systems that carry them from harvest to the point of sale and consumers. The products may be coated by coatings that extend the shelf life, improve transport, protect product quality and freshness, and/or safety. The coatings include edible and non-edible coatings.

In one embodiment, the disclosure provides a method for increasing the volume and/or weight capacity of a system that stores and/or transports product, wherein at least part of the surface of the product is coated with silk fibroin, chitin, mono- and di-acyl glycerides, shellac, starch, high fructose corn syrup, mayauba wax, maydelilla wax, beeswax or other waxes, vegetable oil, paraffin oil, Ethylenediaminetetraacetic acid ("EDTA"), cellulose, pectin, alginate, chitosan, gum Arabic, soy protein, zein, casein, and/or whey. In one embodiment, the system is a truck, a boat, an airplane, a transport and/or storage container, and the like. In one embodiment, the system is refrigerated. In one embodiment, the system is not refrigerated and carries the product at ambient temperature. In one embodiment, the system is a closed system. In one embodiment, the system is an open system.

In one embodiment, the method increases the volume and/or weight capacity of the storage and/or transport system by at least 1%, at least 5%, least 10%, at least 15%, at least 20%, at least 25%, at least 50%, at least 60%, at least 70%, at least 80%, at least 90%, at least 100%, at least 150%, at least 200%, at least 300%, at least 400%, at least 500%, at least 1000%, etc, relative to the standard values in the art. In one embodiment, the method allows for at least 1%, at least 5%, at least 10%, at least 15%, at least 20%, at least 25%, at least 50%, at least 60%, at least 70%, at least 80%, at least 90%, or 100% of the volume of the system to be used for product storage.

In one embodiment, the method allows for a reduction in the energy required to store and/or transport the product of at least 1%, at least 5%, at least 10%, at least 15%, at least 20%, at least 25%, at least 50%, at least 60%, at least 70%, at least 80%, at least 90%, or 100%, relative to the standard values in the art. In one embodiment, the method allows for a reduction in the refrigeration costs during transport of at least 1%, at least 5%, at least 10%, at least 15%, at least 20%, at least 25%, at least 50%, at least 60%, at least 70%, at least 80%, at least 90%, or at least 95%, relative to the standard values in the art. In one embodiment, the method allows for a reduction in the humidification/dehumidification costs during storage and/or transport of at least 1%, at least 5%, at least 10%, at least 15%, at least 20%, at least 25%, at least 50%, at least 60%, at least 70%, at least 80%, at least 90%, or at least 95%, relative to the standard values in the art.

In one embodiment, the method allows for a reduction in the packaging costs during storage and/or transport of at least 1%, at least 5%, at least 10%, at least 15%, at least 20%, at least 25%, at least 50%, at least 60%, at least 70%, at least 80%, at least 90%, or at least 95%, relative to the standard values in the art.

In one embodiment, the method allows for a reduction in the air, $CO_2$, $N_2$, hydrogen sulfide, steam, and other gas costs during storage and/or transport of at least 1%, at least 5%, at least 10%, at least 15%, at least 20%, at least 25%, at least 50%, at least 60%, at least 70%, at least 80%, at least 90%, or at least 95%, relative to the standard values in the art.

In one embodiment, the standard capacity of a truck or container that transports spinach is ⅓ full. In one embodiment, the method allows the truck or container to be at least ⅔ full, etc., or 100% full of spinach. In one embodiment, the standard for a truck or container that transports "baby leaf" produce (spinach, kale, etc) is less than about 80% capacity. In one embodiment, the standard for truck or container capacity for Broccoli is about 40-60% capacity (50% broccoli, remainder ice slurry); Green onions are shipped at about 25-50% green onion, remainder ice; and Cilantro is shipped at 20-40% cilantro, remainder ice. In one embodiment, the method allows for a reduction in the amount of ice. In one embodiment, the disclosure provides a method that allows truck or container capacity (e.g., volume utilization) to increase by at least 1%, at least 2%, at least 3%, at least 4%, at least 5%, at least 10%, at least 15%, at least 20%, at least 25%, at least 50%, at least 60%, at least 70%, at least 80%, at least 90%, at least 95%, at least 100%, at least 200%, at least 300% and percentages in between, relative to standard capacity. In one embodiment, the method of the disclosure allows for transport without ice or with reduced amounts of ice. In one embodiment, the disclosure provides a method that allows a reduction in the amount of ice required for transport by at least 1%, at least 2%, at least 3%, at least 4%, at least 5%, at least 10%, at least 15%, at least 20%, at least 25%, at least 50%, at least 60%, at least 70%, at least 80%, at least 90%, at least 95%, at least 100%, at least 200%, at least 300% and percentages in between, relative to standard ice levels. In one embodiment, the disclosure provides a method of improving transport by train, air, and/or sea.

In one embodiment, the produce is a plant. In one embodiment, the plant is a vegetable or herb. In one embodiment, the vegetable or herb is selected from the group consisting of arugula, asparagus, basil, beet, broccoli, brussel sprout, cabbage, carrot, cauliflower, celery, chard, chicory, chive, coriander, corn, dill, endive, garlic, kale, lavender, leek, lettuce, mint, mushrooms, oregano, parsley, parsnip, pea, peanuts, rosemary, spinach, soybean, squash, thyme, turnip, and yam. Examples of other plants are provided elsewhere in the specification.

In one embodiment, the produce is a fruit. In one embodiment, the fruit is selected from the group consisting of alfalfa, apples, apricots, avocados, barley, beans, berries, blueberries, bananas, beans, citrus, cucumbers, damsons, eggplants, grapes, grapefruits, figs, kiwis, mangoes, melons, nectarines, oranges, papayas, peaches, pears, peppers, pineapples, plums, pumpkins, raspberries, rice, rye, sorghum, strawberries, sunflowers, tomatoes, wheat, and zucchinis, etc. Examples of other fruits are provided elsewhere in the specification.

In one embodiment, the flower is selected from roses, carnations, orchids, tulips, narcissus, daffodils, anthurium, mimosa, gladiolus, lilies, ferns, freesia. In one embodiment, the flower is selected from *Arabidopsis thaliana*, Afrimay violet, alstromeria, anemone, aster, azalea, begonia, bellflower, bougainvillea, buttercup, cactus, camellia, carnation, chrysanthemum, clematis, cockscomb, columbine, cosmos, cyclamen, daffodil, dahlia, daisy, false cypress, forsythia, freesia, gardenia, gladioli, hibiscus, hollyhock, hydrangea, iris, lilac, lily, mum, peony, pelargonium, petunia, poinsettia, poppy, rose, saintpaulia, snapdragon, statice, sunflower, tulip, orchid, waxflower, and zinnia. Examples of other flowers are provided elsewhere in the specification.

In one embodiment, the method comprises contacting the surface of the product with silk fibroin, chitin, mono- and di-acyl glycerides and/or others (edible) coatings prior to and/or during transport. In one embodiment, at least some of the surface of the product is coated with silk fibroin and/or any other (edible) coating. In one embodiment, at least at least 1%, at least 5%, at least 10%, at least 15%, at least 20%, at least 25%, at least 50%, at least 60%, at least 70%, at least 80%, at least 90%, at least 95%, or 100% of the surface is coated with silk fibroin and/or any other (edible) coating. In one embodiment, at least 1%, at least 5%, at least 10%, at least 15%, at least 20%, at least 25%, at least 50%, at least 60%, at least 70%, at least 80%, at least 90%, at least 95%, or 100% of the surface is coated with one or more mono- or diacyl glycerides.

In one embodiment, the coating decreases the temperature of the coated product. In one embodiment, the coating decreases the respiration rate of the coated product. In one embodiment, the temperature and/or respiration rate is decreased by at least 1%, at least 5%, at least 10%, at least 15%, at least 20%, at least 25%, at least 50%, at least 60%, at least 70%, at least 80%, at least 90%, or at least 95% relative to that of the uncoated product. Accordingly, the disclosure provides a method of decreasing the temperature and/or respiration rate of a product comprising coating it with silk protein and/or any other (edible) coating. In one embodiment, the method of decreasing the temperature and/or respiration rate of the product comprises contacting the surface of the product with silk fibroin, chitin, mono- and di-acyl glycerides and/or other (edible) coatings prior to and/or during transport. In another embodiment, the method is carried out to minimize water loss in the harvested plant part. Water loss or transpiration, refers to water vapor movement from the harvested plant part to the environment.

In one embodiment, the silk fibroin, chitin, mono- and di-acyl glycerides and/or other coatings (including edible coatings) provides an insulative effect. For example, the insulative effect may allow the coated product to reduce internal temperature increases compared to an uncoated product. In one embodiment, the insulative effect is increased by at least 1%, at least 5%, at least 10%, at least 15%, at least 20%, at least 25%, at least 50%, at least 60%, at least 70%, at least 80%, at least 90%, or at least 95% relative to that of the uncoated product. Accordingly, the disclosure provides a method of improving insulation of a product comprising coating it with silk fibroin, chitin, mono- and di-acyl glycerides and/or other (edible) coatings.

In one embodiment, the silk coating and/or other (edible) coating provides a UV filtering effect. In one embodiment, the UV filtering effect is increased by at least 1%, at least 5%, at least 10%, at least 15%, at least 20%, at least 25%, at least 50%, at least 60%, at least 70%, at least 80%, at least 90%, or at least 95% relative to that of the uncoated product. Accordingly, the disclosure provides a method of improving UV filtration of a product comprising coating it with silk fibroin, chitin, mono- and di-acyl glycerides and/or other (edible) coatings.

In one embodiment, the surface is coated prior to harvesting. In one embodiment, the surface is coated during harvesting by the harvester. In one embodiment, the surface is coated within at least 5 minutes, at least 10 minutes, at least one hour, at least 12 hours, at least 48 hours, or at least 72 hours from harvesting (i.e., prior to or after). In one embodiment, the surface is coated after harvest but prior to transport. In one embodiment, the surface is coated within 1 hour, 2 hours, 3 hours, 4 hours, 5 hours, 6 hours, 7 hours, 8 hours, 9 hours, 10 hours, 11 hours, 12 hours, 24 hours, 48 hours, or 72 hours from transport. In one embodiment, the surface is coated prior to, during, and/or after transport.

In one embodiment, a metric of the coated item selected from one or more of visual inspection (e.g., yellowing, wilting, rot, color), structural integrity, microbial load (e.g., microbial growth), bounce back (e.g., the ability of certain products (e.g., leafy greens) to recover from the negative effects of wilting once washed through rehydration, which shows assists in showing whether the product was damaged) respiration rate, taste, temperature, insulative effect, UV filtering effect, and/or odor. In one embodiment, the yellowing of a coated item decreases compared to an uncoated item by at least 1%, at least 2%, at least 5%, at least 10%, at least 15%, at least 20%, at least 25%, at least 30%, at least 40%, at least 50%, at least 75%. In one embodiment, the wilting of a coated item decreases compared to an uncoated item by at least 1%, at least 2%, at least 5%, at least 10%, at least 15%, at least 20%, at least 25%, at least 30%, at least 40%, at least 50%, at least 75%. In one embodiment, the rot of a coated item decreases compared to an uncoated item by at least 1%, at least 2%, at least 5%, at least 10%, at least 15%, at least 20%, at least 25%, at least 30%, at least 40%, at least 50%, at least 75%.

In one embodiment, the coating can extend the shelf life of products in storage or a similar environment. In some embodiments, the coatings of the present technology can extend the shelf life of a product compared to an uncoated product by, at least 2 percent, at least 3 percent, at least 4 percent, at least 5 percent, at least 10 percent, and least 20 percent, at least 30 percent, at least 50%, at least 75%, and at least 100 percent, or at least any number in between. In one embodiment, the coatings extend the shelf life by 2-3 times. In a further embodiment the coatings may permit optimization of product processing by extending the shelf life of products. For example, a product could be harvested, coated, and stored to await similar product that is harvested later to permit efficient processing. This could reduce processing times, manpower needed for processing, cost for processing, and other similar efficiency gains.

In one embodiment, the coating may permit higher storage and/or transportation temperatures for a product. For example, if a product is normally refrigerated at about 40 degrees Fahrenheit it could be kept at a temperature from about 40-70 degrees Fahrenheit. In a further embodiment, the coating could enable a product to withstand short heat spikes, for example up to 100 degrees Fahrenheit for a product normally stored at about 40 degrees Fahrenheit. The coating would enable a reduction in refrigeration costs. The coating would also enable product to handle unpredictable transportation and/or storage environments more easily.

In one embodiment, the silk fibroin, chitin, mono- and di-acyl glycerides and/or other (edible) coatings are added to the product either as a powder or as a solution in which powdered silk fibroin, chitin, mono- and di-acyl glycerides, and other (edible) coatings have been reconstituted within a solvent.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 3 shows rot as a method for classifying the properties of the tested product.

DETAILED DESCRIPTION

Figure 1:
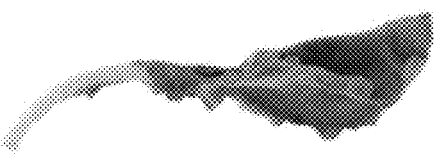
FIG. 1 shows wilting severity as a method for classifying the properties of the tested product.
Figure 1:
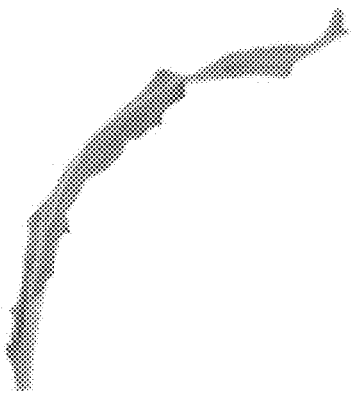
Figure 1:
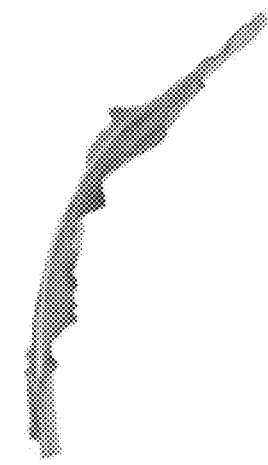
Figure 1:
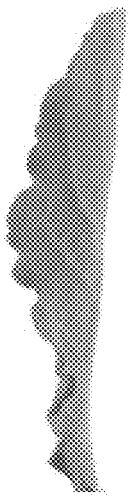

The disclosure relates to methods and compositions for improving transportation of food, flowers, plants or the like.

Definitions

In order for the present disclosure to be more readily understood, certain terms are first defined below. Additional definitions for the following terms and other terms are set forth throughout the Specification.

As used in this Specification and the appended claims, the singular forms "a," "an" and "the" include plural referents unless the context clearly dictates otherwise.

Unless specifically stated or obvious from context, as used herein, the term "or" is understood to be inclusive and covers both "or" and "and".

The term "and/or" where used herein is to be taken as specific disclosure of each of the two specified features or components with or without the other. Thus, the term "and/or" as used in a phrase such as "A and/or B" herein is intended to include A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

The terms "e.g.," and "i.e." as used herein, are used merely by way of example, without limitation intended, and should not be construed as referring only those items explicitly enumerated in the specification.

The term "edible coating" refers to a thin layer of edible material, which is formed as a protective coating on foods and may be consumed together with those products. These layers are applied in liquid form onto the food surface, usually by immersing the product in a film-forming solution formed by the structural matrix. Edible and non-edible coatings of the disclosure may provide a barrier to moisture, oxygen, carbon dioxide, and solute movement from the product. They not only reduce the loss of moisture, they may also delay the process of ripening, and prevent microbial spoilage. Some (edible) coatings may be composed of polysaccharides, proteins, lipids, or a combination of these compounds. Most often, compounds of each of the three categories need to be combined. Materials may be added to improve the structural, mechanical, or handling properties, as well as to improve quality, flavour, colour, or nutritional properties of the coated product. These may include plasticizers (increase the strength and flexibility of the coating but may also increase the coating permeability to water vapour and gases. Examples of plasticizers include polyols (e.g., glycerol, sorbitol, mannitol, propylene glycol, and polyethylene glycol), sucrose, sucrose fatty acid esters, and acetylated monoglycerides.

The terms "or more", "at least", "more than", and the like, e.g., "at least one" are understood to include but not be limited to at least 1, 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more than the stated value. Also included is any greater number or fraction in between.

Conversely, the term "no more than" includes each value less than the stated value. In one embodiment, "no more than 100" includes 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, and 0. Also included is any lesser number or fraction in between.

The terms "plurality", "at least two", "two or more", "at least second", and the like, are understood to include but not limited to at least 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110,111, 112, 113, 114,115, 116, 117, 118,119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more. Also included is any greater number or fraction in between.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. It is understood that wherever embodiments are described herein with the language "comprising," otherwise analogous embodiments described in terms of "consisting of" and/or "consisting essentially of" are also provided. The term "consisting of" excludes any element, step, or ingredient not specified in the claim. In one embodiment, "consisting of" is defined as "closing the claim to the inclusion of materials other than those recited except for impurities ordinarily associated therewith." A claim which depends from a claim which "consists of" the recited elements or steps may not add an element or step. The terms "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Unless specifically stated or evident from context, as used herein, the term "about" refers to a value or composition that is within an acceptable error range for the particular value or composition as determined by one of ordinary skill in the art, which will depend in part on how the value or composition is measured or determined, i.e., the limitations of the measurement system. In one embodiment, "about" or "approximately" may mean within one or more than one standard deviation per the practice in the art. "About" or "approximately" may mean a range of up to 10% (i.e., ±10%). Thus, "about" may be understood to be within 10%, 9%, 8%, 7%, 6%, 5%, 4%, 3%, 2%, 1%, 0.5%, 0.1%, 0.05%, 0.01%, or 0.001% greater or less than the stated value. In one embodiment, about 5 mg may include any amount between 4.5 mg and 5.5 mg. Furthermore, particularly with respect to biological systems or processes, the terms may mean up to an order of magnitude or up to 5-fold of a value. When particular values or compositions are provided in the instant disclosure, unless otherwise stated, the meaning of "about" or "approximately" should be assumed to be within an acceptable error range for that particular value or composition.

As described herein, the term "plant" refers to any living organism belonging to the kingdom Plantae, including, but not limited to, trees, herbs, bushes, grasses, and vines. The term refers to both monocots and dicots. Exemplary plants include, but are not limited to, corn, potatoes, roses, apple trees, sunflowers, wheat, rice, bananas, tomatoes, pumpkins, squash, lettuce, cabbage, oak trees, guzmania, geraniums, hibiscus, clematis, poinsettias, sugarmaye, taro, duck weed, pine trees, Kentucky blue grass, zoysia, coconut trees, brassica leafy vegetables (e.g., broccoli, broccoli raab, Brussels sprouts, cabbage, Chinese cabbage (e.g., Bok Choy and Napa), cauliflower, cavalo, collards, kale, kohlrabi, mustard greens, rape greens, and other brassica leafy vegetable crops), bulb vegetables (e.g., garlic, leek, onion (dry bulb, green, and Welch), shallot, and other bulb vegetable crops), citrus fruits (e.g., grapefruit, lemon, lime, orange, tangerine, citrus hybrids, pummelo, and other citrus fruit crops), cucurbit vegetables (e.g., cucumber, citron melon, edible gourds, gherkin, muskmelons (including hybrids and/or cultivars of cucumis melons), water-melon, maytaloupe, and other cucurbit vegetable crops), fruiting vegetables (including eggplant, ground cherry, pepino, pepper, tomato, tomatillo, and other fruiting vegetable crops), grape, leafy vegetables (e.g., romaine), root/tuber and corm vegetables (e.g., potato), and tree nuts (e.g., almond, pemay, pistachio, and walnut), berries (e.g., tomatoes, barberries, currants, elderberryies, gooseberries, honeysuckles, mayapples, nannyberries, Oregon-grapes, see-buckthorns, hackberries, bearberries, lingonberries, strawberries, sea grapes, lackberries, cloudberries, loganberries, raspberries, salmonberries, thimbleberries, and wineberries), cereal crops (e.g., corn, rice, wheat, barley, sorghum, millets, oats, ryes, triticales, buckwheats, fonio, and quinoa), pome fruit (e.g., apples, pears), stone fruits (e.g., coffees, jujubes, mangos, olives, coconuts, oil palms, pistachios, almonds, apricots, cherries, damsons, nectarines, peaches and plums), vines (e.g., table grapes and wine grapes), fibber crops (e.g. hemp and cotton), ornamentals, and the like. In some embodiments, the plant is an edible plant, or an edible plant part. In accordance with this embodiment, the edible plant part is selected from the group consisting of alfalfa, apple, apricot, argula, asparagus, avocado, banana, blueberry, barley, basil, bean, beet, berries, blueberries, broccoli, brussel sprout, cabbage, carrot, cauliflower, celery, chard, chicory, chives, citrus, corn, coriander, cucumber, damson, dill, eggplant, endive, figs, garlic, grape, grapefruit, kale, kiwi, lavender, leek, lettuce, mango, mayola, melon, mint, mushroom, nectarine, oregano, orange, onion, papaya, parsley, parsnip, pea, peach, peanut, pear, pepper, pineapple, plum, potato, pumpkin, radish, raspberry, rice, rosemary, rye, sweet potato, sorghum, soybean, spinach, squash, strawberry, squash, sunflower, thyme, turnip, tomato, wheat, yam, and zucchini. The plant part may be selected from the group consisting of a flower, a fruit, a vegetable, and a herb.

Further, as used in the following, the terms "preferably", "more preferably", "most preferably", "particularly", "more particularly", "specifically", "more specifically" or similar terms are used in conjunction with optional features, without restricting further possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding further embodiments of the disclosure, without any restrictions regarding the scope of the disclosure and without any restriction regarding the possibility of combining the features introduced in such way with other optional or non-optional features of the disclosure.

The term "shelf life" means the duration of time that a product may be stored without becoming unfit for use, consumption, or sale. Shelf life is therefore the maximum time for which a product may be stored under expected or specified conditions. The term "extending the shelf life" means that the coating prolongs the shelf life compared to a product without the coating when both products are processed and stored under identical or substantially identical conditions. In some embodiments, the coatings of the present technology can extend the shelf life of a product compared to an uncoated product by, at least 2 percent, at least 3 percent, at least 4 percent, at least 5 percent, at least 10 percent, and least 20 percent, at least 30 percent, and at least 100 percent, or at least any number in between. In one embodiment, the coatings extend the shelf life by 2-3 times.

As described herein, any concentration range, percentage range, ratio range or integer range is to be understood to be inclusive of the value of any integer within the recited range and, when appropriate, fractions thereof (such as one-tenth and one-hundredth of an integer), unless otherwise indicated.

Units, prefixes, and symbols used herein are provided using their Système International de Unites (SI) accepted form. Numeric ranges are inclusive of the numbers defining the range.

Description

Produce grower/shippers and processors can see upwards of 30% product losses throughout the supply chain, even despite a highly efficient cold chain. Some companies ship leafy greens (spinach, arugula, baby kale, etc.) from their growing regions to their processing facilities at low density to minimize spoilage. This results in low freight capacity utilization. This disclosure provides means to mitigate this issue through natural and edible food coatings that extend shelf life by combating the major mechanisms of spoilage: microbial growth, oxidation, moisture loss, and/or gas exchange. In one embodiment, the disclosure implements a solution post-processing and/or prior to packing. In one embodiment, the disclosure provides the impact of Cambridge Crops' products (e.g., silk fibroin coating) in driving supply chain efficiencies: reduced shrink; increased freight capacity utilization, reducing the number of trucks on the road, reductions in cost and carbon emissions and other environmental advantages. In one embodiment, the coating is applied immediately post-harvest (e.g., by the harvester (e.g., any human or machine that can assist in harvesting product including but not limited to a harvester, combine, threshers, stripper cleaners, stripper loaders, tree shakers, picking machines, spinners/digger, huller, husker, conveyors, augers, reaper-binders, swathers, etc.) during a wash cycle). In one embodiment, the coating is applied pre-harvest. In one embodiment, the coating is applied after the produce has been washed. In one embodiment, the coating is applied during the wash process (e.g., during the third wash in a triple wash cycle). In one embodiment, the coating is applied prior to placing the product in packaging. In one embodiment, the coating is applied after the product is shipped to a distribution center.

In one embodiment, the transport totes are packed with greens to 100% utilization. In one embodiment, the greens are exposed to short heat spikes to simulate inhomogenous cooling in field as well as cold-chain breaks over the course of 6 days.

In one embodiment, the metrics are selected from one or more of visual inspection (e.g., yellowing, wilting, rot, color), structural integrity, microbial load (e.g., microbial growth), bounce back (e.g., the ability of certain products (e.g., leafy greens) to recover from the negative effects of wilting once washed through rehydration, which shows assists in showing whether the product was damaged), respiration rate, taste, temperature, insulative effect, UV filtering effect, and/or odor. In one embodiment, the disclosure provides a method to provide for alternative shipment methods that may be longer than traditional shipment methods. The alternative methods are made possible by the use of the coating, which extends the shelf life and/or limits the decomposition of the product.

Accordingly, in one embodiment, the products are contacted with one or more coating agents. In one embodiment, the coating agents are combined with pulsed light treatments, high hydrostatic pressure, gamma-radiation, ozone, UV light, modified atmospheric packaging, which may work additively or synergistically with the coating agents. In one embodiment, the coating agents are edible. Edible coatings and other plant coatings may be fabricated from different materials, which may be generally classified into three categories: hydrocolloids, including polysaccharides and proteins; lipids; and composite materials, consisting of a combination of different hydrocolloids or hydrocolloids and lipids, to take advantage of the complementary functional properties of the different constitutive materials or overcome the respective drawbacks.

In one embodiment, the product is contacted (e.g., coated) with silk protein. In one embodiment, the product is contacted (e.g., coated, mixed with) with one or more of the following coating agents to improve storage and/or transport: high fructose corn syrup, starch, acetylated glycerides (e.g., mono- and/or di-acyl glyceride(s)), a mixture of monoacylglycerides (i.e., monoglycerides or fatty acid monoesters of glycerol), primarily 2,3-dihydroxypropyl palmitate, 1,3-dihydroxypropan-2-yl palmitates. In one embodiment, the coating is selected from one or more of lipids, resins, polysaccharides, proteins (e.g., silk, soy, whey, rice bran extract, egg albumin and wheat protein), polymers, composites, bilayer compositions, plastisizers (e.g., low molecular eight polyols), antifoam agents (which may be selected from alkyl poly acrylates, fatty acids, fatty alcohols, monoglycerides, diglycerides, triglycerides, a silicone-based foam control agent, and mixtures thereof), surfactants (e.g., lecithin and lecithin derivatives, acetylated monoglycerides (e.g., mono- and/or di-acyl glyceride(s)), ethylene glycol, monostearate, glycerol monostearate, and sorbitan fatty acid esters (Tweens)), and emulsifiers. The term "silicone-based foam control agent" refers to a polymer with a silicon backbone. In one embodiment, the foam control agent is a silicone-based foam control agent. Suitable silicone-based foam control agents include, but are not limited to, polydimethylsiloxane fluid and polydimethylsiloxane-treated silica. In one embodiment, the coating is a mixture of one or more film-forming agent with a low molecular weight molecule. As used herein, the term "glyceride" refers to esters where one, two, or three of the —OH groups of the glycerol have been esterified. Monoglycerides, diglycerides, and triglycerides may comprise esters of any of the fatty acids described herein. Examples of suitable fatty acids are saturated or unsaturated and may be obtained from natural sources (e.g., palm oil, coconut oil, babassu oil, safflower oil, tall oil, castor oil, tallow and fish oils, grease, and mixtures thereof) or may be synthetically prepared. Examples of suitable fatty acids for use in the present invention include capric acid, lauric acid, myristic acid, palmitic acid, stearic acid, arachidic acid, and behenic acid. In one embodiment, the coating includes a mixture of any of the listed agents.

In one embodiment, the carbohydrate materials are selected from cellulose, starch, pectin, alginate, carragean, furcellaran, chitosam, gum Arabic, gum ghatti, gun karaya, guar gum, locust bean gum, xanthan gum, gellan gum, gum tragamayth, wax (beeswax, paraffin and polyethylene wax, and other petroleum-based products), resin (shellac, wood rosin, coumarone). In one embodiment, the protein material is selected from silk protein, soy protein, zein (corn), casein, whey, wheat gluten, rice bran extract, egg albumin, and peanut protein.

In one embodiment, the (edible) coating is selected from Aloe vera gel, basil seed mucilage, gum Arabic, fungal chitosan, gelating, chitosan, guar gum, sodium alginate, calcium chloride, xanthan gum, carboxymethylcellulose, stearic acid, chitosan hydrochloride, cassava startch (which may be reinforced by startch nanocrystals), Aloe arborescens gel, fucoidan, maltodextrins, whey protein isolates, nanocellulose, pectin, corn flour, ethanolic extracts of the leaves and pods of cocoa, leaves, and hulls of coffee, locust bean gum, sesame proteins, whey protein nanofibrils, sweet potato starch, transglutaminase, walnut flour protein, and mixtures thereof. In one embodiment, one or more of these compounds is combined with silk fibroin protein.

In one embodiment, the coating impacts one or more of the following: delay ripening of the product (e.g., fruit, vegetable), delay color change, reduce water loss, reduce decay, improve appearance, reduce chilling and/or mechanical injury, and add shine or gloss. In one embodiment, ripening is a process that includes changes in color, flavor, and texture (e.g. softening). In one embodiment, the coatings carry natural antagonists to pathogens (e.g., nature seal (NS), NS+US 7, NS+Imazali, shellac+Imazalie). In one embodiment, the disclosure provides coatings that may be used as carriers of other useful ingredients such as color or aroma additives, antimicrobials, flavours (e.g., vanilla essence), nutraceuticals and anti-oxidants. Ingredients such as a nutraceutical agent or an immune response enhancer may also be added to provide additional properties to the coating. The nutraceutical agent typically comprises at least one probiotic, examples of which include *Lactobacillus acidophilus, Lactobacillus casei* and, *Bifidobacterium lactic*. An example of immune response enhancer includes a yeast gluco polysaccharide. In some embodiments, these additional ingredients are incorporated into the coating solution to further improve the quality, stability, and safety of the product.

In one embodiment, the product is climacteric fruit. In one embodiment, the product is non-climacteric fruits. Climacteric fruit continue to ripen after harvest, whereas non-climacteric do not. Climateric produce typically requires expedited shipment.

In one embodiment, the product is further exposed to temperature control. In one embodiment, temperature control is used because it may affect the rate of fruit respiration. In general, higher temperatures increase, and lower temperatures decrease fruit and vegetable respiration rates.

In one embodiment, the product is exposed to controlled atmosphere storage and/or modified atmosphere packaging. In one embodiment, these methods are combined with one or more of the coatings of the disclosure.

In one embodiment, the silk compositions of the present disclosure comprise natural and edible silk coatings that may extend the shelf life of perishable goods and decrease reliance on energy and cost intensive cold chains. The silk coatings of the present disclosure may be odorless, low cost, edible, compostable, and biodegradable. Silk fibroin is a structural protein that may be produced and extracted from silkworm, spiders, or other insects. It may also be otherwise generated synthetically. Silk fibroin is naturally produced by species such as, without limitation, *Antheraea mylitta; Araneus bicentenarius; Araneus ventricosus; Bombyx mori; Bombyx mandarins; Galleria mellonella; Nephila clavipes; Nephila madagascariensis*; and *Tetragnatha versicolor*. Silk fibroin's unique properties are derived from its structure, consisting of hydrophobic blocks separated by hydrophilic spacers. In its natural state, silk fibroin is organized in beta-sheets, which are formed by highly ordered crystalline regions alternated by amorphous regions. This unique structure results in high levels of strength and toughness for silk fibroin-based materials. The wide range of forms into which silk fibroin solution may be processed make it attractive for several high-tech applications, including scaffolds for tissue engineering, bone screws for fixation, and drug depots for therapeutic delivery. In some embodiments, the silk compositions are as described in U.S. Patent Application Publication No. US 2020-0178576 A1 and U.S. patent application Ser. No. 17/230,822, incorporated herein by reference in their entirety. The silk fibroin may be isolated from silk sericin and the protein coat through the Ajisawa method or through other methods using water and salts, including chaotropic salts. In some embodiments, silk fibroin may be prepared according to the method described in Marelli, B., Brenckle, M., Kaplan, D. et al. Silk Fibroin as Edible Coating for Perishable Food Preservation. *Sci Rep* 6, 25263 (2016), https://doi.org/10.1038/srep25263, incorporated herein by reference in its entirety.

In one embodiment, the silk fibroin may be a dried powder. In some further embodiments, the silk fibroin may be in liquid form. In some embodiments, the solution may comprise the silk fibroin powder mixed with a solvent. In some embodiments, the solvent may be a liquid. In some further embodiments, the solvent may be an acid with a pH under 6.9. Alternatively, the solvent may be an alcohol or water. In other embodiments, the solvent may be acetic acid. In some embodiments, the silk fibroin powder may be in a mixture containing an additive. In some alternative embodiments, the liquid solvent may contain an additive. In some embodiments, both the silk fibroin powder mixture and the liquid solvent may contain additives. In some alternative embodiments, the silk fibroin may be emulsified with the additive prior to being mixed into the solution. In one embodiment, liquid silk fibroin may be mixed or dry-blended with the additive prior to being mixed into the solution. In some embodiments, the additive may be at least one of a sugar, a plasticizer, or a crosslinking agent. In one embodiment, the sugar additive may be a sugar-ol, a poly-ol, or a hygroscopic polymer (e.g., polyethylene glycol). In other examples, if the sugar additive is a crosslinking agent, the crosslinking agent may be photoreactive. Specifically, the crosslinking agent may be, for example, one or more of horseradish peroxidase, lysyl oxidase, disuccinimidyl suberate, disuccinimidyl glutarate, N-hydroxysuccinimide ester, or an aryl azide. In some alternative embodiments, the additive may include one or more of a bacterium, a metal, an enzyme, or a biologic. In one embodiment, the metal may include one or more of an alkali metal, an alkaline earth metal, or a transition metal. In one embodiment, the enzyme may include erepsin maltase, lactase, sucrase, disaccharidases, lingual lipase, lysozymes, salivary amylase, pepsin, gastric lipase, other lipases, hydrochloric acids, intrinsic factors, mucins, gastrins, trypsinogen, ductal cells, carboxypeptidase, elastases, and the like. In some other alternative embodiments, the additive may be at least one of a coloring agent, a chelator, a ligand, an antimicrobial, a filler, a scent, or a flavor. In one embodiment, the coloring agent may be allura red, Ponceau 3R, amaranth, erythrosine, indigotine, Light Green SF, Naphthol yellow, Orange 1, quinoline yellow, tartrazine, an E1 suit (e.g., E100, E161b, etc.), an anthocyanin, a betacyanin, a carotenoid, or a phenolic. In other examples, the chelator may be ethylenediaminetetraacetic acid (EDTA), transferrin, or desferrixoxamine. In other examples, the microbial may be acetic acid, benzoic acid, natamycin, nisin, nitrate, nitrite, propionic acid, sorbic acid, sulfite, or sulfur dioxide. In other examples, the filler may be cellulose. In other alternative embodiments, the additive may be at least one of a vitamin, a nutrient, an antioxidant, and a protein. In one embodiment, the protein may be a peptide, an amino acid, (e.g., a post-translated amino acid), or a synthetic amino acid. A nutrient may be defined as a mineral, protein, carbohydrate, fat, Q10, glutathione, lithium, probiotic, glycine, DHA, flavonoid, or others. An antioxidant may include vitamins C and E, selenium, carotenoids, thiols, catalase, superoxide dismutase, uric acid, and ubiquinol. In some further alternative embodiments, the additive may be at least one of a green tea extract, a rosemary extract, a phenolic antioxidant, catechin, acerola, tocopherol, chamomile extract, malphigia emarginata, *Camellia sinensis*, epicatechin, epigallocatechin, gallochatechin, epigallocatechin gallates, vitamin A, vitamin E, vitamin D, vitamin K, and/or vitamin C. In some embodiments, the additive may be mixed with an accelerant or an excipient. In one embodiment, the additive may be mixed with polyethylene glycol or xylitol. In some further embodiments, the additive may be emulsified with the accelerant or excipient and mixed into a silk fibroin solution.

In some further embodiments, the solution may be deposited onto the product via spray-coating. Alternatively, the solution may be deposited onto the product via dip-coating. In some embodiments, the silk is applied to the product by submersion, coating (e.g., doctor blade, surface coating), washing, tablet coating, and/or lamination. In some other embodiments, the silk is applied to a product by spray coating, curtain coating, or slot coating. In some embodiments, the silk fibroin may not be annealed after or before deposition. In some further embodiments, the product may include multiple layers of silk fibroin. In one embodiment; the product could be sprayed with silk fibroin solution, dried, and then sprayed once more. This may happen any number of times to add thickness and additional layers. In some further embodiments, the product may comprise multiple layers, with each layer serving a function. In one embodiment, the product may be coated with silk fibroin. Then, the silk fibroin-coated product may be itself coated by another coating that is hydrophobic or water-tight such that water may not permeate the outer layer and reach the inner silk fibroin layer. In some further embodiments, a tablet-coating may be utilized, where the silk fibroin is coated while in an industrially-relevant drum. Tablet coating may additionally be utilized, as well as film-coating. A combination of the processes and methods disclosed above could be used to obtain the desired coating performance on any suitable product.

Coatings may be produced by wet (e.g., evaporation of the solvent) or dry methods. Drying may be done by heat conduction or convention or infrared heating. In one embodiment, the coating is applied by one or more of dipping, immersing, spraying, spreading, and/or saturated brushes.

In one embodiment, of the above, the coating may be applied to the surface of the product for between 1 and 3,600 seconds, for example between 1 and 3000 seconds, between 1 and 2000 seconds, between 1 and 1000 seconds, between 1 and 800 seconds, between 1 and 600 seconds, between 1 and 500 seconds, between 1 and 400 seconds, between 1 and 300 seconds, between 1 and 250 seconds, between 1 and 200 seconds, between 1 and 150 seconds, between 1 and 125 seconds, between 1 and 100 seconds, between 1 and 80 seconds, between 1 and 60 seconds, between 1 and 50 seconds, between 1 and 40 seconds, between 1 and 30 seconds, between 1 and 20 seconds, between 1 and 10 seconds, between 5 and 3000 seconds, between 5 and 2000 seconds, between 5 and 1000 seconds, between 5 and 800 seconds, between 5 and 600 seconds, between 5 and 500 seconds, between 5 and 400 seconds, between 5 and 300 seconds, between 5 and 250 seconds, between 5 and 200 seconds, between 5 and 150 seconds, between 5 and 125 seconds, between 5 and 100 seconds, between 5 and 80 seconds, between 5 and 60 seconds, between 5 and 50 seconds, between 5 and 40 seconds, between 5 and 30 seconds, between 5 and 20 seconds, between 5 and 10 seconds, between 10 and 3000 seconds, between 10 and 2000 seconds, between 10 and 1000 seconds, between 10 and 800 seconds, between 10 and 600 seconds, between 10 and 500 seconds, between 10 and 400 seconds, between 10 and 300 seconds, between 10 and 250 seconds, between 10 and 200 seconds, between 10 and 150 seconds, between 10 and 125 seconds, between 10 and 100 seconds, between 10 and 80 seconds, between 10 and 60 seconds, between 10 and 50 seconds, between 10 and 40 seconds, between 10 and 30 seconds, between 10 and 20 seconds, between 20 and 100 seconds, between 100 and 3,000 seconds or between 500 and 2,000 seconds.

Properties of the coating, such as thickness, cross-link density, and permeability, may be varied to be suitable for a particular product by adjusting the specific composition of the coating agent, the specific composition of the solvent, the concentration of the coating agent in the solvent, and the conditions of the coating deposition process. The concentration of the solute (e.g., coating agent) in the solvent may, for example, be in a range of about 0.5 mg/mL to 200 mg/mL.

In one embodiment, the coating is applied to the product as a whole. In one embodiment, the coating is applied to a part of the product. In one embodiment, the coating is applied prior to harvest. In one embodiment, the coating is applied after and/or during harvest. In one embodiment, the product, or a part thereof, by be harvested within 1 hour, 2 hours, 3 hours, 4 hours, 5 hours, 6 hours, 7 hours, 8 hours, 9 hours, 10 hours, 11, 12, 13, 14, 15, 16, 17, 18, 19, 20, 21, 22, 23, 24, 48, 72 hours, or any time and time interval in between or after a coating is applied.

In one embodiment, the coating agent is prepared in an aqueous solution. In one embodiment, the coating agent is prepared in an alcohol solution. In one embodiment, the coating agent is prepared in an organic acid solution. Examples of organic acids include citric acid, malic acid, tartaric acid, acetic acid, lactic acid, and levulinic acid. In one embodiment, the coating solution may comprise 1.00 to 3.00 wt %, 1.00 to 2.50 wt %, 1.00 to 2.00 wt %, 1.50 to 2.00 wt %, or 1.50 to 2.50 wt % coating agent (e.g, silk). In one embodiment, the coating solution may comprise 0.05 to 0.10 wt %, 0.05 to 0.15 wt %, 0.05 to 0.50 wt %, 0.05 to 0.15 wt %, 0.10 to 0.40 wt %, 0.20 to 0.30 wt % coating agent. In one embodiment, the coating solution may comprise 0.05 to 0.10 wt %, 0.05 to 0.15 wt %, 0.05 to 0.50 wt %, 0.05 to 0.15 wt %, 0.10 to 0.40 wt %, 0.15 to 0.35 wt %, 0.20 to 0.30 wt % coating agent. In one embodiment, the aqueous solution may comprise from 90 to 99 wt %, 92 to 99 wt %, 94 to 99 wt %, 96 to 99 wt %, 97 to 99 wt %, or 98 to 99 wt % of water or other solvent. In one embodiment, the coating solution may comprise 1%-20%, or more preferably 2%-7%, or more preferably 2.5%-5% coating agent (e.g., silk). In one embodiment, the agent is present at a concentration of 1, 2, 3, 4, 5, 6, 7, 8, 9, 10, 11, 12, 13, 14, 15, 16, 17, 18, 19, 20, 21, 22, 23, 24.25, 26, 27, 28, 29, 30, 31, 32, 33.34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 96, 97, 98, 99, 100, 200, 300, 400, 500, 600, 700, 800, 900, 1000 micrograms/ml. In one embodiment, the agent is present at a concentration of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39.40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 96, 97, 98, 99, 100, 200, 300, 400, 500, 600, 700, 800, 900, 1000 mg/ml. In one embodiment, the agent is present at a concentration of at least 1, at least 2, at least 3, at least 4, at least 5, at least, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58 residues, at least 59, at least 60, at least 61, at least 62, at least 63, at least 64, at least 65, at least 66, at least 67, at least 68, at least 69, at least 70, at least 71, at least 72, at least 73, at least 74, at least 75, at least 76, at least 77, at least 78, at least 79, at least 80, at least 90, or 100% w/v, or w/w, in the coating solution.

Applying Silk Fibroin to a Product

Cocoons from the *Bombyx mori* may be used as source of silk fibroin. The silk fibroin may be extracted from the cocoons during a multi step process. As a non limiting example of this process, the first step may include degumming, by exposing the cocoons to a compound (e.g., soda ash) to separate the sericin from the cocoons. Next, the cocoons are rinsed with a fluid (e.g., water) to remove the sericin, resulting in cocoons that are primarily made of silk fibroin. The cocoons are then exposed to a second compound (e.g., a chaotropic agent) which dissolves the silk fibroin into a solution (e.g., water). The solution is then purified to remove the second compound (e.g., by dialysis, centrifuging, or other filtering method, including combinations of the above) to yield a solution made primarily of water and solubized silk fibroin. The solution is then sterilized, either by pasteurization or microfiltration, or both, to remove all aggregates, reduce turbidity, and kill microbes. The final concentration of the silk fibroin suspension can be adjusted to include a specific wt %, for example about 1%-20%, or more preferably 2%-7%, or more preferably 2.5%-5%. In some embodiments, the silk fibroin solution is then turned into powder by the use of a spray dryer or other suitable device. Other suitable processes to create the silk fibroin solution could be used.

However, other concentrations of silk fibroin could be used, depending on the food product and the implementation necessary. Similarly, different weight average molecular weight ($M_w$) silk fibroin solutions could be utilized. In some embodiments, the fibroin fragments comprise a weight average molecular weight ($M_w$) from about 1 kDa to about 600 kDa. In some embodiments, the molecular weight (MW) of the silk fibroin fragments may range from about 10 kDa to about 1000 kDa, with concentrations of fragments of different molecular weight (MW).

A product can be coated using various different methods. The first step is creating a solution that contains silk fibroin as described above. In some embodiments, the silk fibroin solution is manufactured directly. In other embodiments, the silk fibroin is turned into a powder, that is then reconstituted into a solution (e.g., water) to create the silk fibroin solution.

Once the silk fibroin solution is created, the product can be coated using various different techniques depending on different variables, such as the type of product, the desired coating type, coverage, thickness, or number of layers, the shipping/storage conditions, the shipping/storage duration, etc. The silk solution may be applied to a product by any suitable method. In some embodiments, the silk is applied to the product by submersion, coating (e.g., spray, airbrush, doctor blade, dip coating, surface coating), washing, tablet coating, and/or lamination. In some embodiments, the silk is applied to a product by spray coating, curtain coating, or slot coating. In some embodiments, the silk is deposited onto a product and then dried via, for example, air-drying, freeze-drying, vacuum drying, or heat-drying. In some aspects, the silk solution may be deposited onto a product via spray-coating. Alternatively, the solution may be deposited onto a product via dip-coating. In some aspects, the silk may be applied by electrospinning.

In some aspects, the product may undergo pre-treatment, by for example being exposed to a basic solution and then dried prior to application of the silk fibroin solution. By a further example, a pre-treatment could include adding a binder and/or adhesive to the product to improve the abrasion resistance or adhesion of the silk solution.

In some aspects, the silk fibroin coating applied to a product may undergo post-treatment to improve the properties of the silk fibroin coating, including treatment with alcohol (e.g., ethanol, isopropanol, or other alcohols). In another aspect, the post-treatment could include ultraviolet exposure to cross-link the silk coating or heat treatment to activate a foaming agent in the silk coating. In some aspects, the silk may or may not be annealed after or before deposition, including by water annealing.

In some further aspects, the product may include multiple layers of silk. In one embodiment, the product may be sprayed with a silk fibroin solution, dried, and then sprayed once more. This may happen any number of times to add thickness and additional layers. In some further aspects, the product may comprise multiple layers, with each layer serving a function. For example, the product may be coated with silk solution. Then, the silk solution coated product may be itself coated by another coating. Such other coating may be hydrophobic. A combination of the processes and methods disclosed above could be used to obtain the desired coating performance on any suitable product.

The silk coating may be of different thicknesses depending on the desired application or method used to create it. In some aspects, the silk coating may be uniform in thickness. In some aspects, the silk coating may not have a uniform thickness. For example, the silk coating may be thinner in some areas due to natural variances caused by the method used to apply the coating (e.g., a spray coating may vary in thickness due to variances during the application process such as spraying one area slightly longer than others resulting in different coating thickness). In other aspects, the thickness may be varied on purpose to create specific barrier properties. In some embodiments the thickness may range from about 10 nm to about 1 mm, from about 10 nm to about 50 nm, from about 50 nm to about 100 nm, from about 100 nm to about 200 nm, from about 100 nm to about 100 µm, from about 200 nm to about 300 nm, from about 300 nm to about 500 nm, from about 500 nm to about 1 µm, from about 1 µm to about 5 µm, from about 5 µm to about 10 µm, from about 10 µm to about 15 µm, from about 10 µm to about 20 µm, from about 10 µm to about 25 µm, from about 10 µm to about 50 µm, from about 10 µm to about 100 µm, from about 15 µm to about 25 µm, from about 15 µm to about 35 µm, from about 15 µm to about 50 µm, from about 20 µm to about 40 µm, from about 20 µm to about 50 µm, from about 25 µm to about 35 µm, from about 25 µm to about 50 µm, from about 25 µm to about 100 µm, from about 30 µm to about 50 µm, from about 30 µm to about 75 µm, from about 40 µm to about 50 µm, from about 40 µm to about 75 µm, from about 50 µm to about 65 µm, from about 50 µm to about 75 µm, from about 50 µm to about 85 µm, from about 50 µm to about 100 µm, from about 100 µm to about 150 µm, from about 100 µm to about 200 µm, from about 100 µm to about 250 µm, from about 150 µm to about 250 µm, from about 100 µm to about 300 µm, from about 100 µm to about 400 µm, from about 100 µm to about 500 µm, from about 200 µm to about 400 µm, from about 200 µm to about 500 µm, from about 400 µm to about 600 µm, from about 500 µm to about 800 µm from, from about 500 µm to about 1 mm, from about 100 µm to about 1 mm.

In an embodiment, the thickness of the silk coating may have a thickness less than 1 mm. In an embodiment, the thickness of the silk coating may have a thickness less than 500 µm. In an embodiment, the thickness of the silk coating may have a thickness less than 300 µm. In an embodiment, the thickness of the silk coating may have a thickness less than 200 µm. In an embodiment, the thickness of the silk coating may have a thickness less than 150 µm. In an embodiment, the thickness of the silk coating may have a thickness less than 100 µm. In an embodiment, the thickness of the silk coating may have a thickness less than 80 µm. In an embodiment, the thickness of the silk coating may have a thickness less than 70 µm. In an embodiment, the thickness of the silk coating may have a thickness less than 60 µm. In an embodiment, the thickness of the silk coating may have a thickness less than 50 µm. In an embodiment, the thickness of the silk coating may have a thickness less than 40 µm. In an embodiment, the thickness of the silk coating may have a thickness less than 30 µm. In an embodiment, the thickness of the silk coating may have a thickness less than 25 µm. In an embodiment, the thickness of the silk coating may have a thickness less than 20 µm. In an embodiment, the thickness of the silk coating may have a thickness less than 15 µm. In an embodiment, the thickness of the silk coating may have a thickness less than 10 µm. In an embodiment, the thickness of the silk coating may have a thickness less than 1 µm. In an embodiment, the thickness of the silk coating may have a thickness less than 500 nm. In an embodiment, the thickness of the silk coating may have a thickness less than 100 nm.

In some aspects, a product may be coated in its entirety or only partially. For example, if the product has a flat shape, such as for kale or spinach, it may be coated on both sides. As a further example, if the product is piece of produce, such as broccoli, it may only be coated on the outside surfaces, with the inner surfaces receiving little to no coating. In another aspect, the product may only be coated over a portion of a surface of a product, for example a surface may only be partially coated such that half of one surface receives a coating. In an embodiment, the product may have about 100% of its total surface area coated, or about 80% or more of its total surface area coated, or about 60% or more of its total surface area coated, or about 50% or more of its total surface area coated, or about 40% or more of its total surface area coated, or about 30% or more of its total surface area coated, or about 20% or more of its total surface area coated, or about 10% or more of its total surface area coated. In some aspects, between about 80% to about 100% of the total surface area of a product may be coated, or between about 60% to about 80% of the total surface area of a product may be coated, or between about 50% to about 80% of the total surface area of a product may be coated, or between about 40% to about 60% of the total surface area of a product may be coated, or between about 20% to about 40% of the total surface area of a product may be coated, or between about 1% to about 20% of the total surface area of a product may be coated.

A combination of the processes and methods disclosed above could be used to obtain the desired coating performance on any suitable product.

Additional embodiments may be derived from the additional attachments.

EXAMPLES

Example 1

Stressed Transit Study

A model was developed to mimic stressed conditions for transport of greens (e.g., spinach, kale, lettuce, etc.) to test the performance of silk fibroin coatings against uncoated greens and/or greens coated with water. Stressed conditions representing increased metabolic rate/premature spoilage were created by recreating increased freight utilization by packing the greens more densely, exposing greens to "extreme" supply chain conditions using heat spikes (e.g., increases in temperature beyond normal temperatures encountered during transit) and then comparing control versus treated groups to test the effects of silk fibroin.

Figure 5:
FIG. 5 shows product in a transit study on Day 1.

In one exemplary experiment regarding greens, the greens (kale) were packed in totes to 100% utilization, as shown in FIG. 5. In normal conditions the totes are packed to about 10-19 pounds, but in this experiment the totes were packed to over 21 pounds, representing an increase in weight of about 13% to about 100%. In total, three sample groups were prepared: a control sample group (kale not treated with any substance); a water sample group (kale treated with water); and a silk coated sample group (kale treated with silk fibroin solution). The water and silk fibroin were applied via spraying. After application, all three groups were hand tossed to better distribute the coating on the water and silk coated sample group and to ensure that all groups were handled in the same manner. The application of the coating and or the distribution method could be changed to create different transit environments with different stresses.

Figure 4:
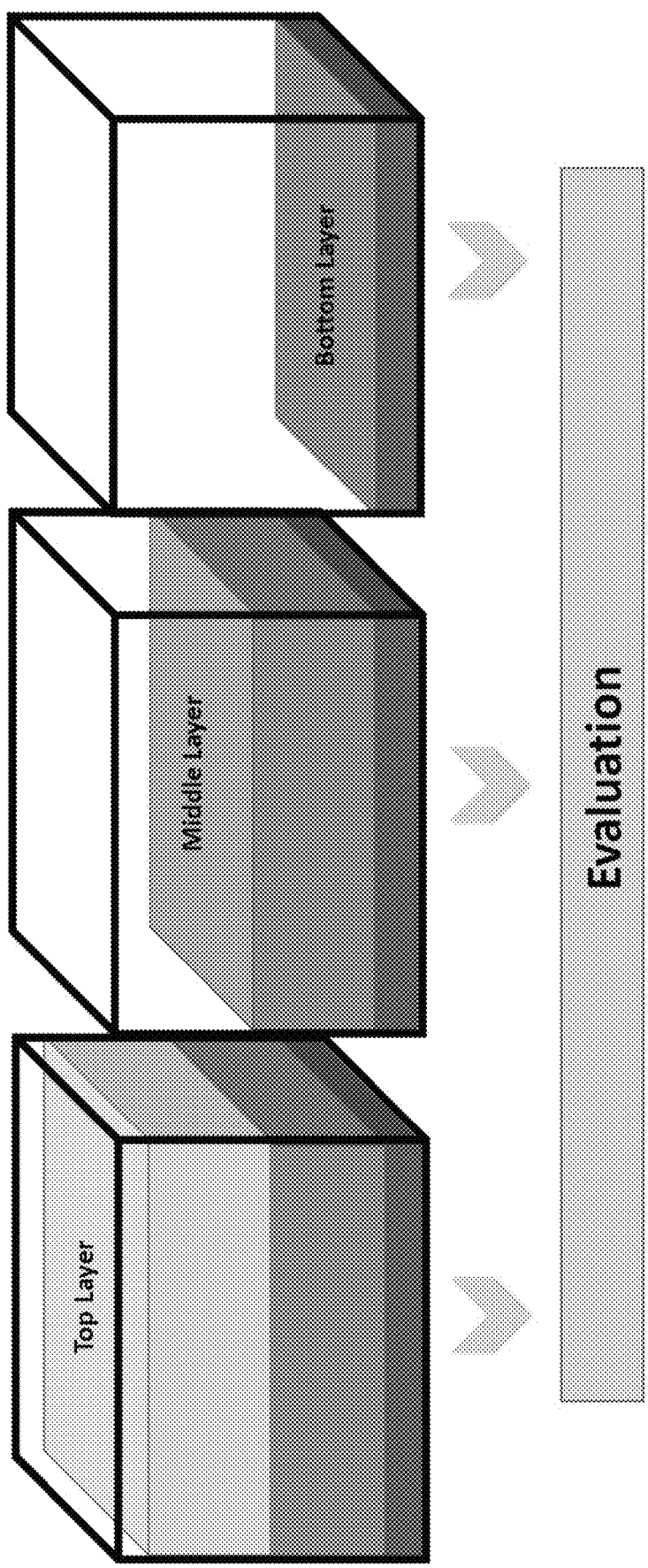
FIG. 4 shows a diagram of different layers of a leafy green in a tote and how they are evaluated.
Figure 6:
FIG. 6 shows product in a transit study on Day 6, with the top layer exposed, (Silk Coated represents a product treated with silk fibroin).
Figure 6:
Figure 6:
Figure 7:
FIG. 7 shows product in a transit study on Day 6, with the middle of the tote layer exposed (Silk Coated represents a product treated with silk).
Figure 7:

The three sample groups were then exposed to a simulated transit test where they were stored at regular temperatures of about 40 degrees Fahrenheit. The samples were then exposed to 3 heat spikes. The temperature of the heat spike was about 100 degrees Fahrenheit and it was held steady for about 30 minutes. The heat spikes were introduced every 24 hours after the start of the experiment (starting after treatment of the kale), so the first occurred at 24 hours, the second occurred at 48 hours, and the third occurred at 72 hours. The three sample groups were returned to the regular storage temperature after each heat spike, and until the conclusion of the study, which was six days after treatment. FIG. 6 shows the top layer of the totes of the different groups on day 6. FIG. 7 shows the middle layer of the totes of the water sample group and the silk coated sample group on day 6. The middle layer is the portion of the container most susceptible to rot due to the increased density of the greens. To better illustrate the different layers of the totes. FIG. 4 shows the layers of a leafy green when held in a tote, with a top, middle, and bottom layer identified.

At the conclusion of the experiment the greens were scored to determine if the groups differed. Multiple different aspects of the product, in this case kale, can be observed and compared, for example, metrics selected from one or more of visual inspection (e.g., yellowing, wilting, rot, color), structural integrity, microbial load (e.g., microbial growth), bounce back (e.g., the ability of certain products (e.g., leafy greens) to recover from the negative effects of wilting once washed through rehydration, which shows assists in showing whether the product was damaged), respiration rate, taste, temperature, insulative effect, UV filtering effect, and/or odor.

Figure 2:
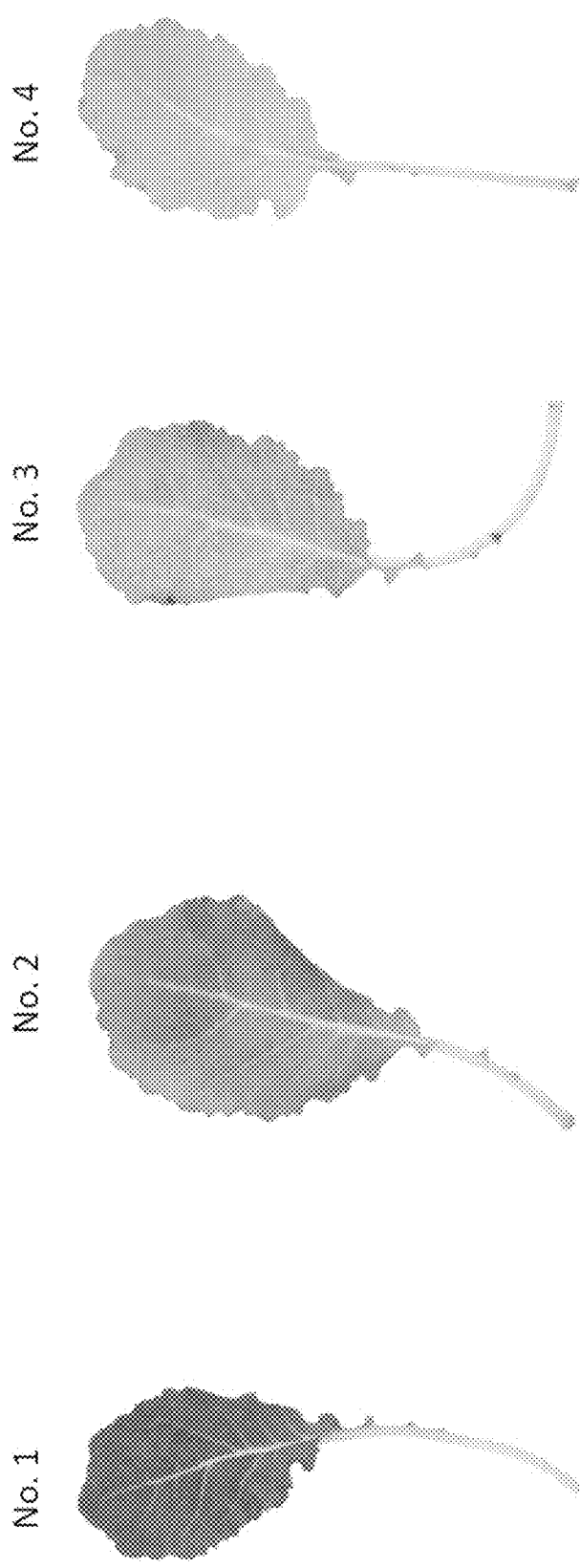
FIG. 2 shows yellowing as a method for classifying the properties of the tested product.
Figure 8:
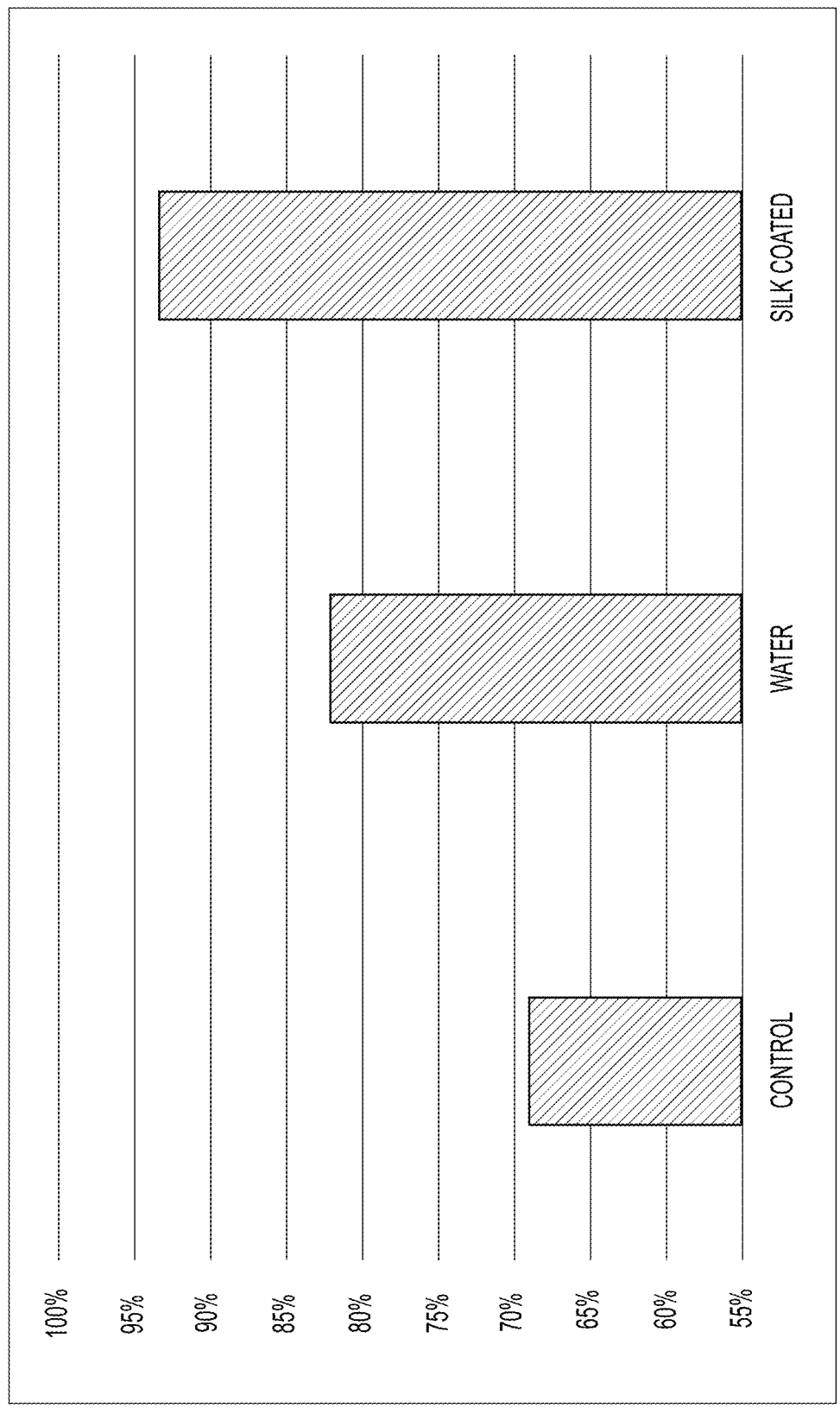
FIG. 8 shows a quantification of percentage of leaves with a yellowing score of 1 or 2 for different treatment methods.
Figure 9:
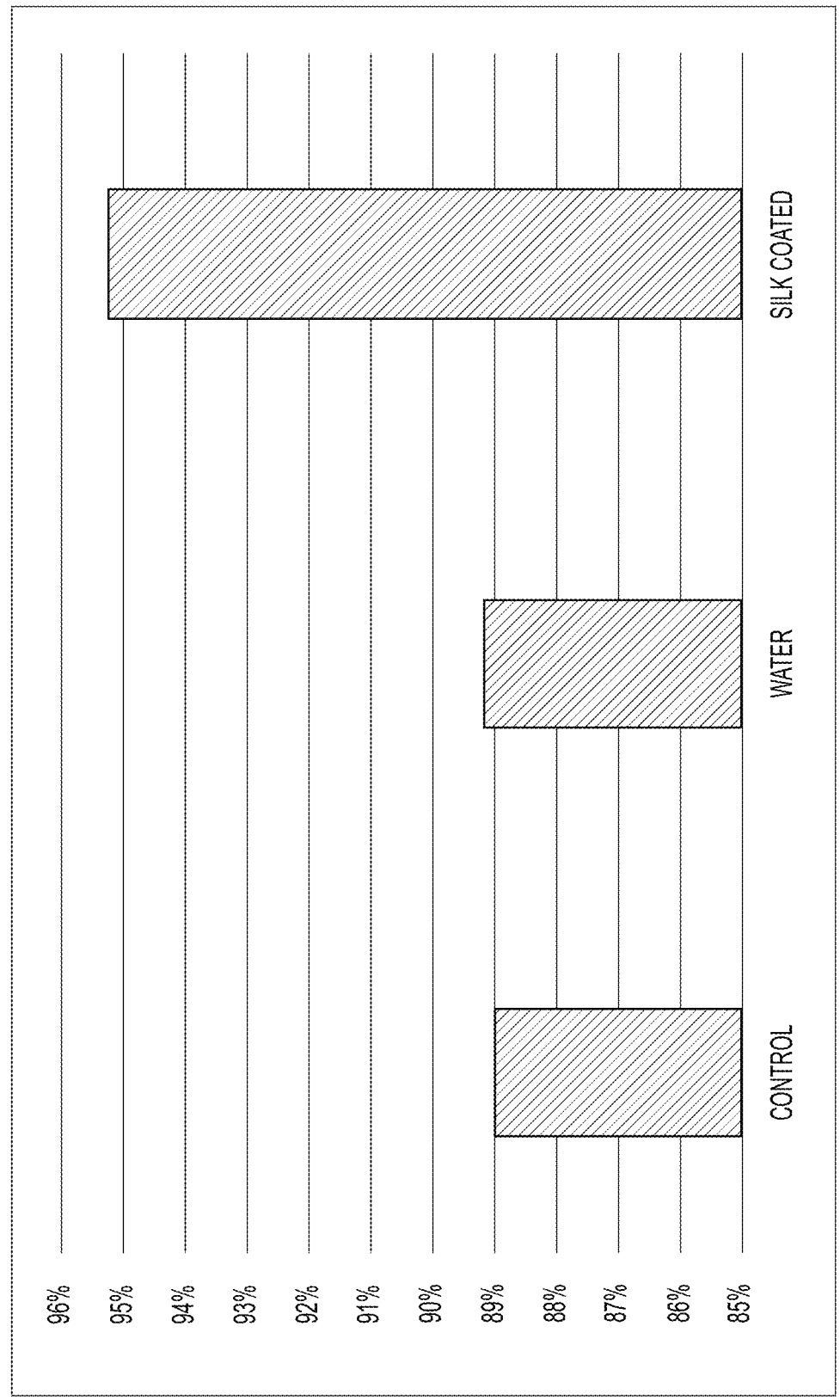
FIG. 9 shows a quantification of the percentage of leaves with a wilting score of 1 or 2 for different treatment methods.
Figure 10:
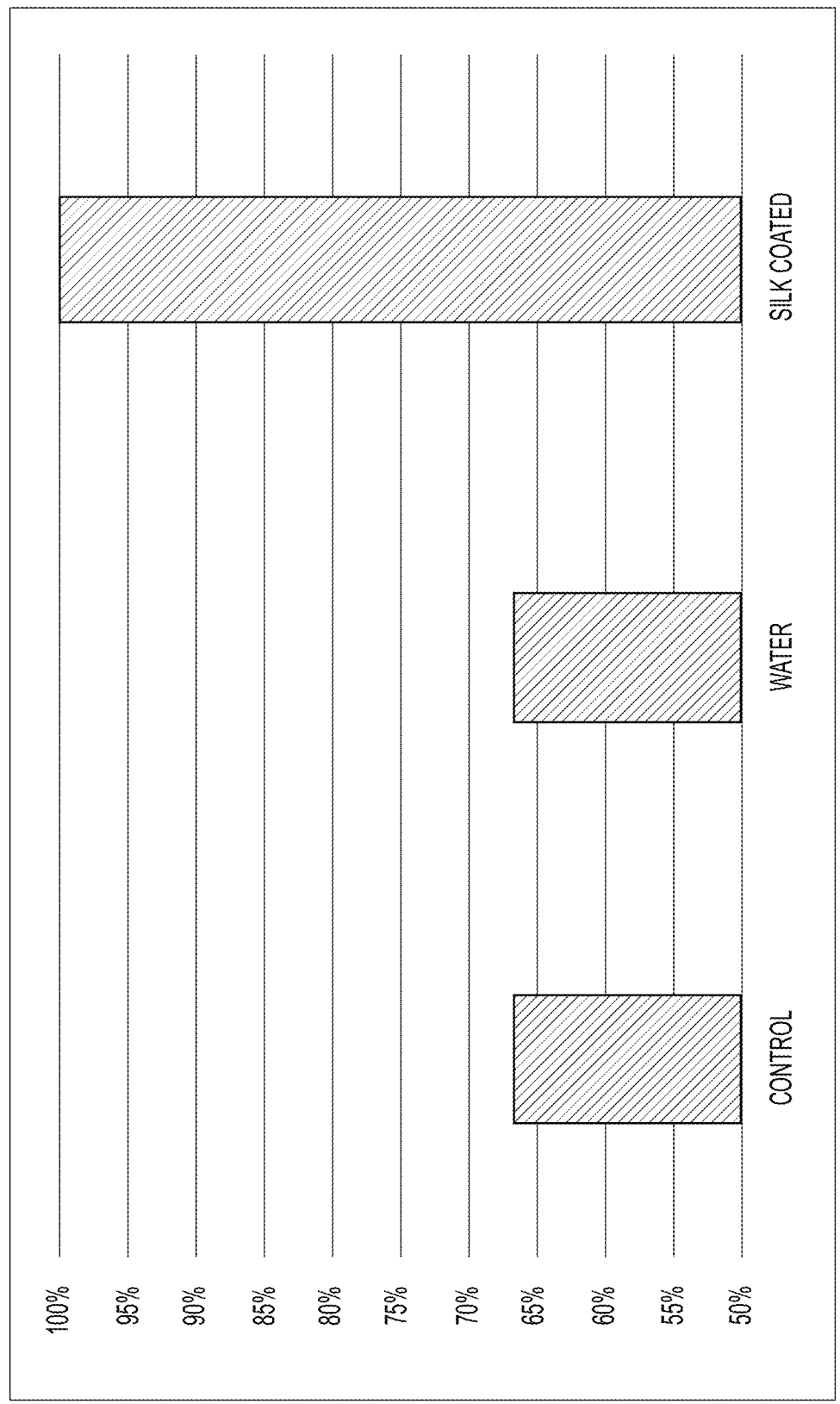
FIG. 10 shows a quantification of the percentage of layers with a rot score of 1 for different treatment methods.

In this experiment wilting, yellowing, and rot were compared across the different groups (e.g., control, water, silk solution). The groups were compared by randomly selecting 20 leaves and assigning them a number based on the scoring scales shown in FIGS. 1-3. FIG. 6 shows the results for yellowing of the leaves after six days for the three groups. The control group on the far left faired the worst, followed by the water group in the middle, with the silk fibroin solution group (Silk Coated) on the right performing the best. This improvement was noticeable at the middle layer of the totes too, as seen in FIG. 7, which shows the middle layer of the water (left) and silk fibroin solution (right) groups after six days. This is illustrated more clearly in FIG. 8, which shows the percentage of leaves in the various groups with a yellowing score of 1 or 2. A score of 1 or 2 was awarded if the leaf had yellowing on 0-10% of leaf surface or on 10-30% of the leaf surface, respectively, as judged in FIG. 2. As FIG. 8 shows, about 93% of the leaves treated with silk fibroin coated achieved a score of 1 or 2, while the control group and water group had approximately 69% and 82%, respectively, of leaves with the same score. FIG. 9 shows the results for wilting across the different groups, with the silk fibroin coated leaves again scoring the largest percentages with a 1 or 2 score at 95%. The control group and the water groups only had approximately 89% of their leaves achieve this score. Finally, FIG. 10 shows rot scores, as a percentage of layers with a 1, across the various groups. In this experiment, the 100% of the silk fibroin coated layers had a rot score of 1, representing that only 0-10% of the surface of the tote surface had rot. In contrast, the control and water groups only had rot scores of 1 on 67% of the tote layers.

These results exemplify the benefits of coating product with silk fibroin, as it decreases the negative effects of packing more product into the same volume of container compared to other methods. It also shows that increased temperatures do not negatively impact the performance of silk fibroin compared to other methods. This latter point is very important because shipping and storage conditions are not always uniform, and heat spikes can occur, either due to equipment issues or delays in transportations. By reducing the harm to the product during shipment disruptions, the silk fibroin coating provides flexibility to shippers and limits food waste. In another aspect, different scoring systems could be created and analyzed to determine the impacts of coatings on a product.

The particulars of the study could be changed to create the desired stress on the coated product. In one aspect, greater or fewer heat spikes could be used, for example from 1-5 heat spikes. In another aspect, the temperatures of the heat spikes could be modified, for example, from 80-120 degrees Fahrenheit. In another aspect, the hold times of the heat spikes could also be modified, for example, from 15 minutes to 1 hour per spike. In another aspect, the frequency of the heat spikes could also be modified by, for example, exposing the product to spikes every 12 hours or once every day. In another aspect, the treatment of the product could also be altered to include non-silk fibroin coatings or multiple groups of different coatings for comparison. In another aspect, different materials could be used to coat the product. In another aspect, a different product entirely could be used, such as a different type of product.

Example 2

Shelf Life Study

A second model was developed to create conditions encountered during transport and storage of greens (e.g., spinach, kale, lettuce, etc.) to test the performance of silk fibroin coatings against uncoated greens packed to normal tote weight, uncoated greens packed at a greater tote weight, and greens coated with silk fibroin packed at a greater tote weight. This experiment was designed to mimic a normal harvest to table timeline that consumers encounter, to measure the impact of silk fibroin on the greens. The increased packing weight was utilized to create a stressed condition for the greens to study the impact of silk fibroin and confirm if greater packing densities were possible as part of the shipping/transport process.

Figure 11:
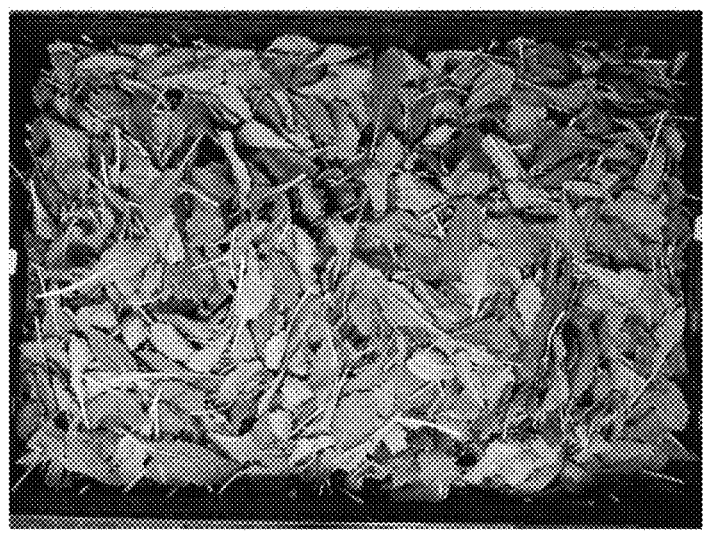
FIG. 11 shows the different groups of kale on day 1 of a shelf life study.
Figure 11:
Figure 11:
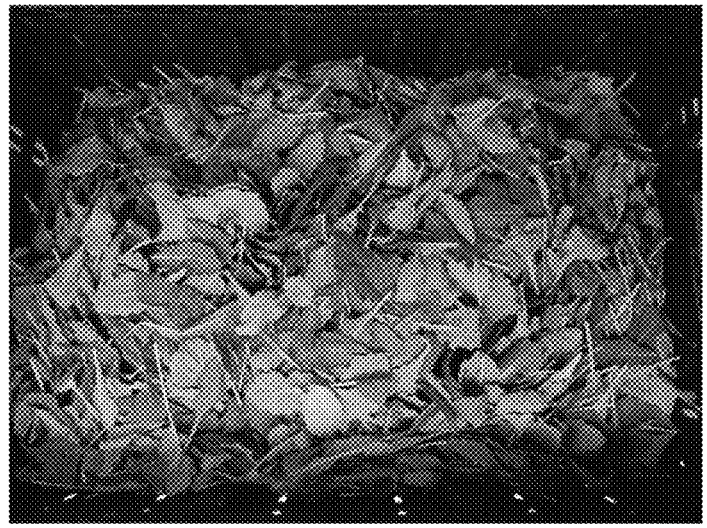

In this exemplary experiment, the greens (baby kale) were collected by a harvester and immediately separated into three groups: the control group (untreated kale packed to 18 pounds); an untreated group (untreated kale packed to 22 pounds): and a silk coated group (kale treated with silk fibroin solution and packed to 22 pounds). The silk fibroin was applied via spraying as the greens were harvested from the field by a spray bar, prior to packing the greens in totes. As mentioned, the control group was not treated and was packed to 18 pounds in totes. The untreated group was not treated and packed to 22 pounds in totes. The silk fibroin coated group was treated with silk fibroin and packed to 22 pounds in totes. The totes were fully utilized at 22 pounds, such that no additional kale could be added. FIG. 11 shows the different groups in their totes on day 1 of the experiment.

Figure 12:
FIG. 12 shows the different groups of kale on day 9 of a shelf life study.
Figure 12:
Figure 12:
Figure 13:
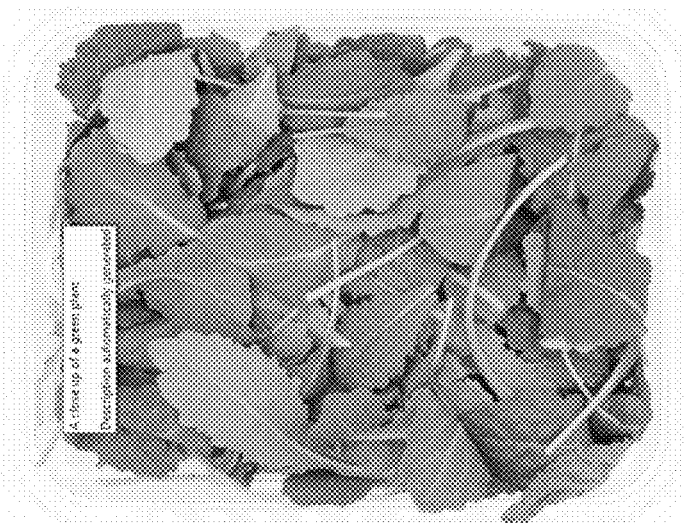
FIG. 13 shows the different groups of kale on day 28 of a shelf life study.
Figure 13:
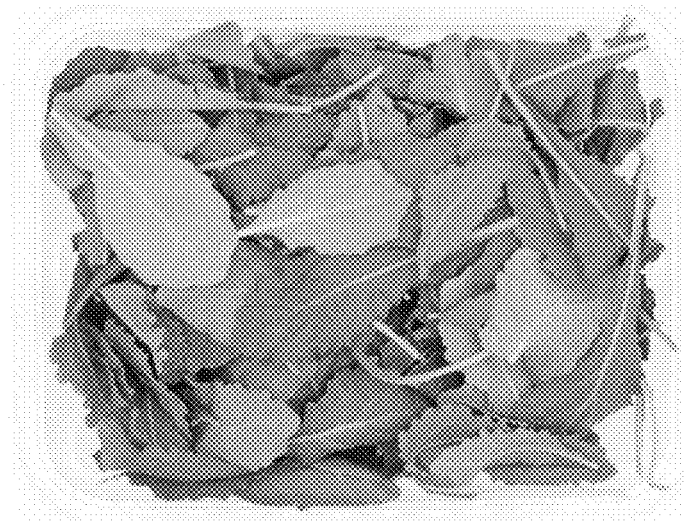
Figure 13:

The next step is to either transport the totes to the testing lab via a trailer (e.g., a refrigerated tractor trailer) or simulate the transport time by storing the totes in the same type of cold storage for the same amount of time it would take to physically transport the greens. In this experiment, the totes were physically transported by tractor trailer to Cambridge Crops' lab over the course of approximately 5 days. During this time the three groups were stored at temperatures of about 40 degrees Fahrenheit and about 40% relative humidity. Once the totes arrived at Cambridge Crops, they were processed by being washed and then transferred to clamshells to simulate the normal process for transporting and then packing the greens for sale. Other containers could be used besides clamshells, such as bags. These containers could be various sizes depending on the sale size intended. In this case, the clamshells were 5 ounces and the transported greens were evenly divided up. For example, 13 clamshells were created for the control group, 13 clamshells were created for the untreated group, and 14 clamshells were created for the silk coated group. FIG. 12 shows the different groups divided into their clamshells on day 9 of the experiment. FIG. 13 shows the clamshells at day 28 of the experiment. The clamshells were then stored in a cold room at 40 degrees Fahrenheit and 52% relative humidity for the duration of the experiment. The experiment continued for 41 days and the different clamshells were sampled throughout this period and at the end of the experiment to provide data on the performance of each group.

At the conclusion of the experiment the scores were complied to determine if the groups differed throughout the experiment. Multiple different aspects of the product, in this case kale, can be observed and compared, for example, metrics selected from one or more of visual inspection (e.g., yellowing, wilting, rot, color), structural integrity, microbial load (e.g., microbial growth), bounce back (e.g., the ability of certain products (e.g., leafy greens) to recover from the negative effects of wilting once washed through rehydration, which shows assists in showing whether the product was damaged) respiration rate, taste, temperature, insulative effect, UV filtering effect, and/or odor.

Figure 14:
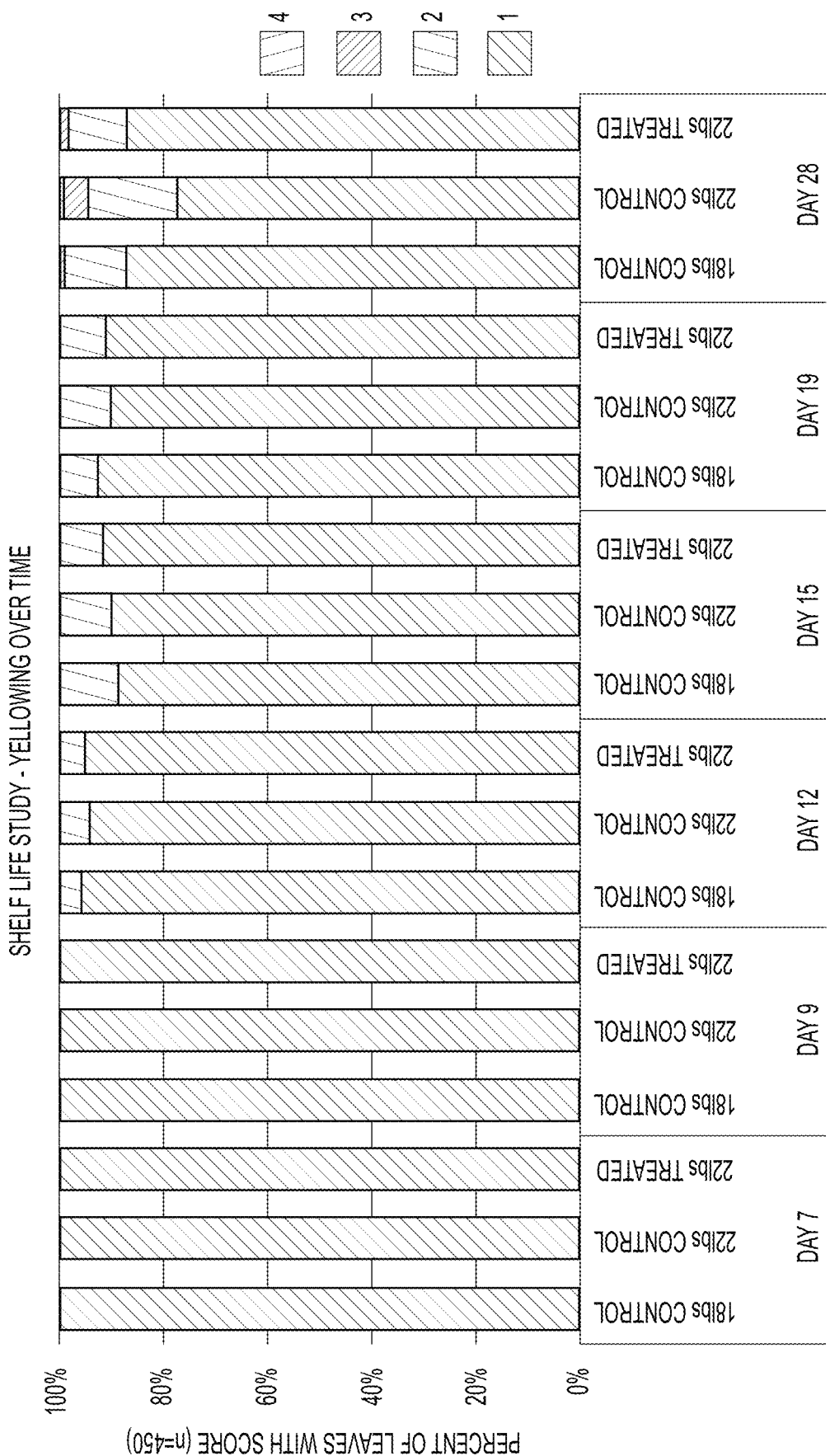
FIG. 14 shows a quantification of the yellowing scores for the leaves in the shelf life study over time.
Figure 15:
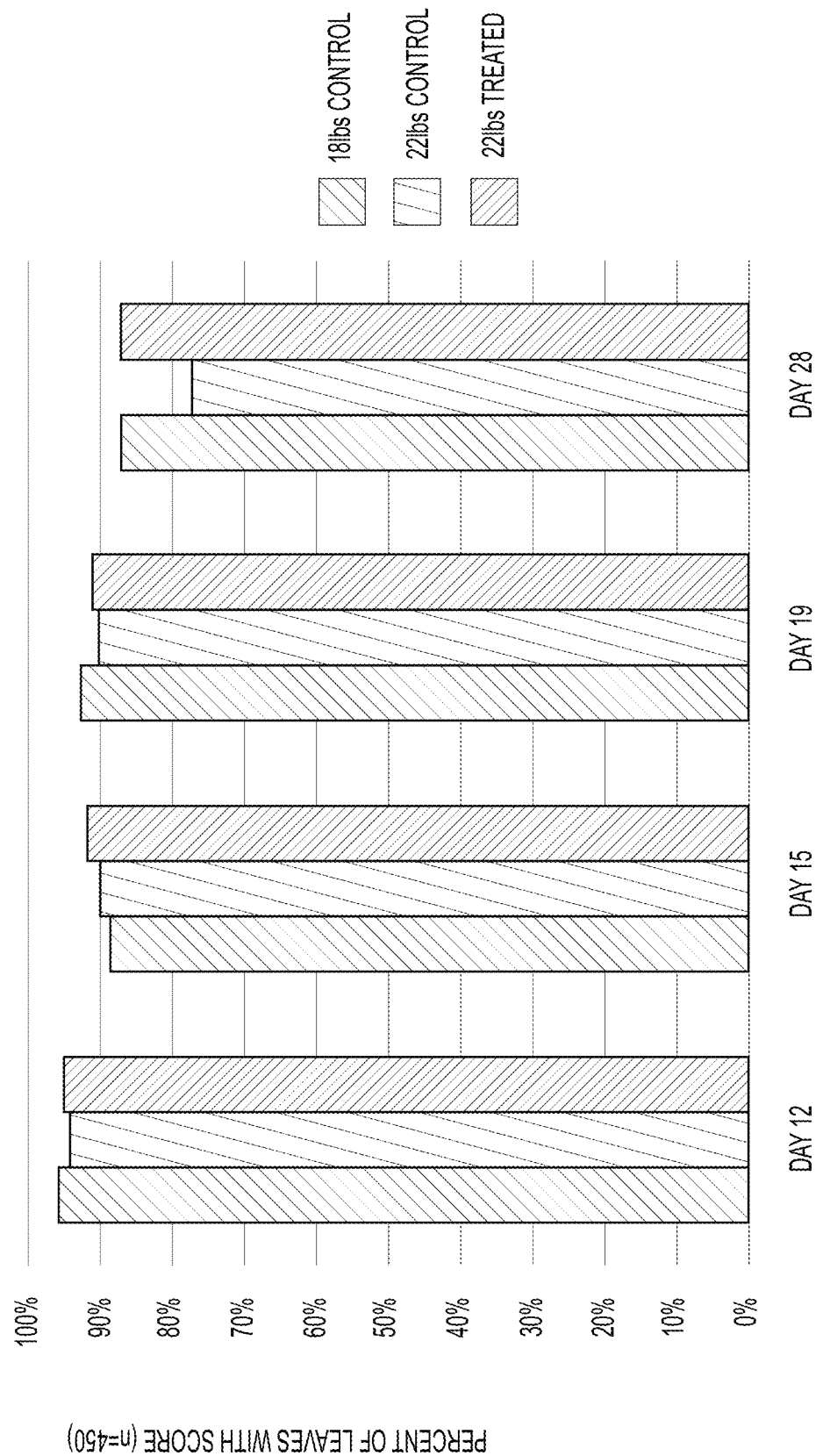
FIG. 15 shows a quantification of the yellowing scores for the leaves in the shelf life study over time.
Figure 16:
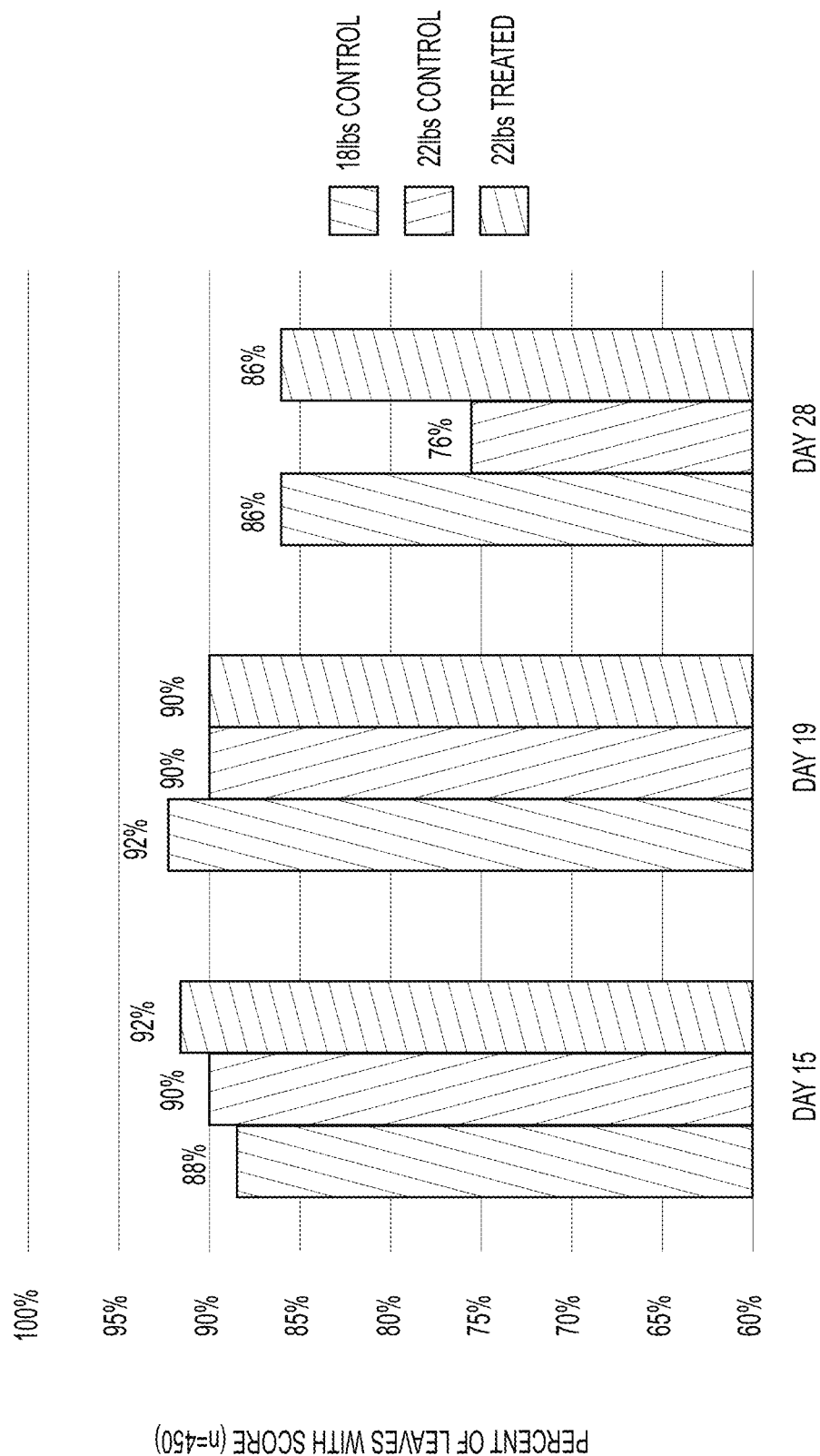
FIG. 16 shows a quantification of the yellowing scores for the leaves in the shelf life study over time.

In this experiment wilting and yellowing were compared across the different groups (e.g., control, untreated, silk coated). The groups were compared by randomly selecting 15 leaves from the clamshells and assigning them a number based on the scales shown in FIGS. 1-2. As can be seen in FIG. 14, the yellowing results over the first 28 days of the experiment show that the untreated group is performing worse than the other two groups. This is more clearly shown in FIG. 15, which shows the percentage of leaves with a "good" yellowing score (meaning they scored a 1). In this case, the control group and the silk treated group had the same percentage of leaves with a "good" score, whereas the untreated group faired noticeably worse (about 10%). FIG. 16 shows the same types of results, with the control group and the silk treated groups fairing better than the untreated group when both yellowing and wilting were examined. As this graph shows, a "good" score was achieved if yellowing was a 1 and wilting was a 1 or 2. Again, the control group and the silk treated group outperformed the untreated group by day 28 by over 10%.

In this case, the silk coated group performed as well as the control group despite being packed more tightly during transport. These results exemplify the benefits of coating produce, particularly kale, with silk fibroin, as it decreases the negative effects of packing more product into the same volume of container compared to other methods. This will enable a shipper to add more kale to each shipment without worrying about harming the kale by reducing its shelf life, which would not be the case with untreated kale. This has the potential to save shipping costs, reduce fuel consumption, remove trucks on the road, and for shippers to realize other efficiencies. In addition, the coating was washed off the kale during the processing step. This showcases the knock-on effect of the silk coating, because it does not have to remain on the product to impact shelf life.

The study described above was exemplary and the particulars of the study could be changed to create the desired stress on the coated product. For example, different materials could be used to coat the product. In another aspect, a different product entirely could be used, such as a different type of product. Different conditions could be implemented, such as by changing temperatures, humidity, duration, packing method, etc. Finally, different measurements of the product tested could be taken, such as respiration rate, structural integrity, microbial load, and the like.

Example 3

Respiration Testing

Figure 17:
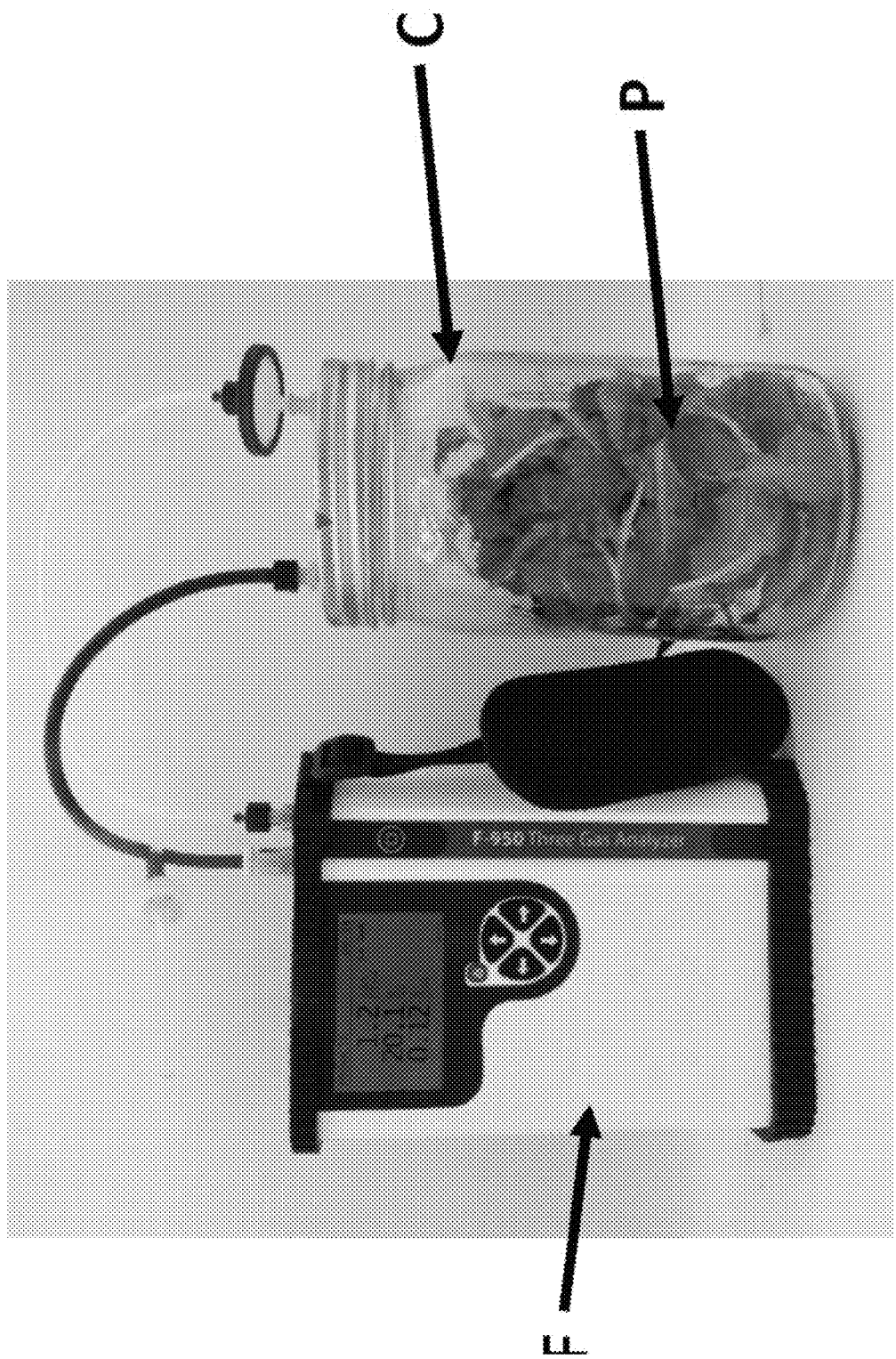
FIG. 17 shows a respiration testing setup used to collect respiration data.
Figure 18:
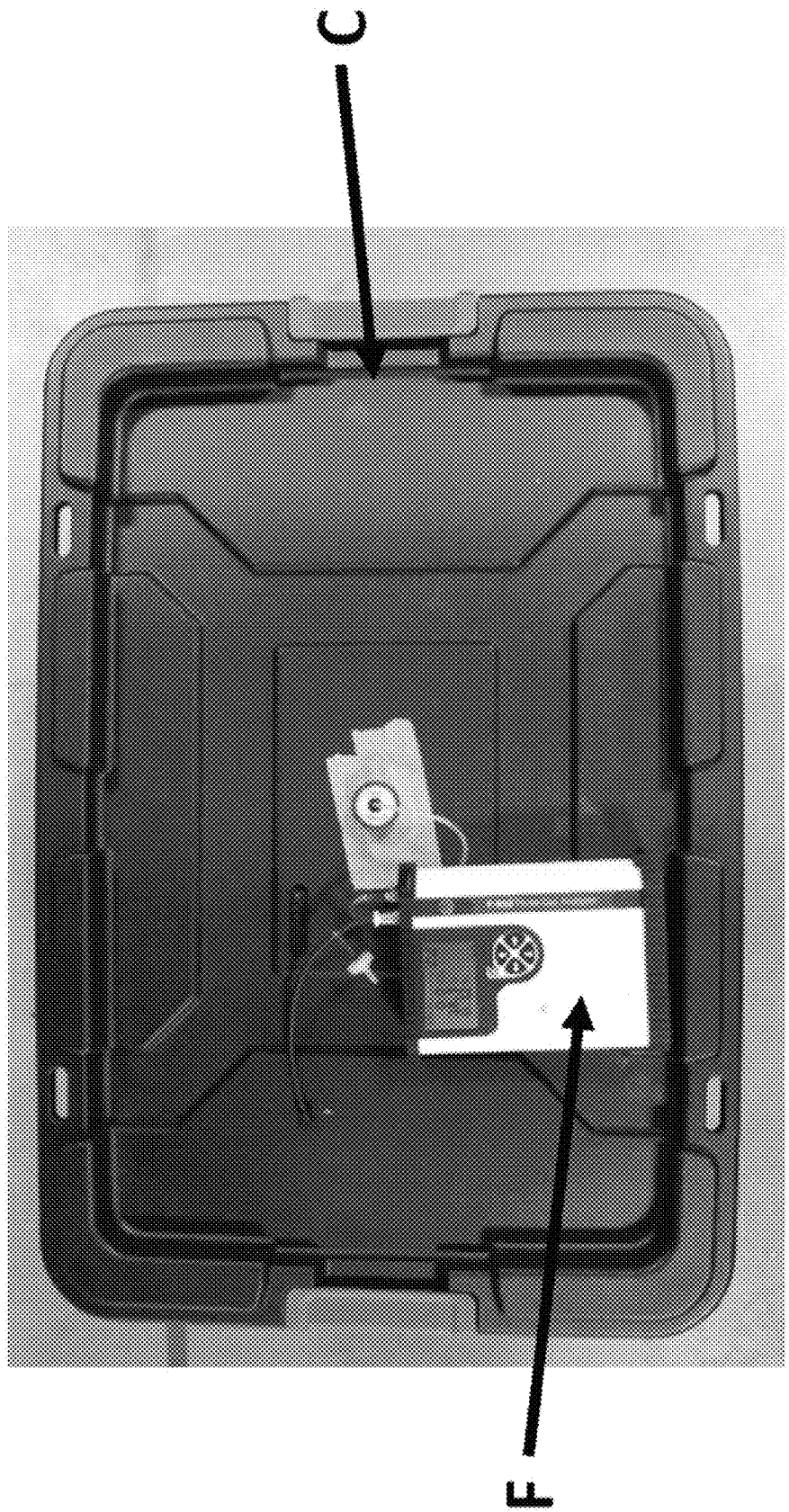
FIG. 18 shows a second respiration testing setup used to collect respiration data.

To study the respiration of different products, two different methods have been developed. The first tests small sample sizes, generally between 20-50 grams that are placed in a jar (e.g., a mason jar). FIG. 17 shows an example of this method, with the container (C), product (P), and testing device (F) shown. In this process the product (P) is placed in the contained (C) and an initial carbon dioxide ($CO_2$) measurement is taken. The container is then left to rest for a predetermined amount of time (e.g., 15 minutes to an hour) and a second $CO_2$ measurement is taken. In this case, a Felix Instruments F-950 (F) was used to measure the $CO_2$. A final rate of respiration is provided and is expressed as mL $CO_2$ $kg^{-1}$ $hr^{-1}$. In the second method, a larger container is tested (e.g., a tote) for respiration rate. FIG. 18 shows the container (C) and testing device (F). The same process is used as for FIG. 17, just on a larger scale. The end result is another respiration rate measurement represented in mL $CO_2$ $kg^{-1}$ $hr^{-1}$.

We claim:

1. A method of increasing the performance of a transport system having a performance variable, wherein the transport system transports a product, stores a product, or both, and wherein the product is food, flowers or plants and comprises at least one of edible proteins, fruits, vegetables, nuts, seeds, pet food, animal feed, or combinations thereof, the method comprising:

coating at least part of the surface of the product, which is initially uncoated, with a substance to create a coated product, wherein the substance is selected from the group consisting of: silk fibroin, chitin, acetylated monoglycerides, shellac, starch, high fructose corn syrup, mayauba wax, maydelilla wax, beeswax, vegetable oil, paraffin oil, ethylenediaminetetraacetic acid, cellulose, pectin, alginate, chitosan, gum Arabic, soy protein, zein, casein, whey, and combinations thereof;
thereby increasing the performance of the transport system by improving at least one performance variable of the coated product compared to the uncoated product when the product is at least one of transported and stored in the transport system, wherein the vegetables comprise one or more of spinach, kale, arugula, lettuce, spring mix, cilantro, broccoli, green onion, and parsley; wherein the product is coated during washing.

2. The method of claim 1, further including at least one of a step of transporting and a step of storing the coated product in the transport system for a period of time.

3. The method of claim 1, further comprising a step of increasing the freight capacity of the transport system, wherein the transport system has a first freight capacity of the product prior to coating and a second freight capacity of the coated product, and wherein the second freight capacity is larger than the first freight capacity.

4. The method of claim 3, wherein the freight capacity of the system is the weight of the product, and wherein the second freight capacity is increased by at least 5% compared to the first freight capacity.

5. The method of claim 4, wherein the second freight capacity is increased by at least 15% compared to the first freight capacity.

6. The method of claim 3, wherein the freight capacity of the system is the volume utilization of the transport system, and wherein the second freight capacity is increased by at least 5% compared to the first freight capacity.

7. The method of claim 1, wherein the product is coated pre-harvest.

8. The method of claim 1, wherein the product is coated post-harvest.

9. The method of claim 1, wherein the product is coated during harvest.

10. The method of claim 9, wherein the product is coated by a harvester.

11. The method of claim 1, wherein the product is coated post-harvest.

12. The method of claim 1, wherein at least one of the performance variables of the product is selected from one of the following: color, structural integrity, respiration rate, microbial load, yellowing, wilting, bounce back, taste, odor, temperature, insulative effect, UV filtering effect, and rot.

13. The method of claim 12, wherein yellowing of the product is reduced by at least 5%.

14. The method of claim 12 wherein wilting of the product is reduced by at least 5%.

15. The method of claim 12, wherein rot of the product is decreased by at least 5%.

16. A method of increasing the performance of a transport system having a performance variable, wherein the transport system transports a product, stores a product, or both, and wherein the product is food, flowers or plants and comprises at least one of edible proteins, fruits, vegetables, nuts, seeds, pet food, animal feed, or combinations thereof, the method comprising:
coating at least part of the surface of the product, which is initially uncoated, with a substance to create a coated product, wherein the substance is selected from the group consisting of: silk fibroin, chitin, acetylated monoglycerides, shellac, starch, high fructose corn syrup, mayauba wax, maydelilla wax, beeswax, vegetable oil, paraffin oil, ethylenediaminetetraacetic acid, cellulose, pectin, alginate, chitosan, gum Arabic, soy protein, zein, casein, whey, and combinations thereof;
thereby increasing the performance of the transport system by improving at least one performance variable of the coated product compared to the uncoated product when the product is at least one of transported and stored in the transport system, wherein at least one of the performance variables of the product is selected from one of the following: yellowing, wilting, and rot, and further wherein the performance variables are improved by at least one of the following: yellowing of the product is reduced by at least 5%, wilting of the product is reduced by at least 5%, and rot of the product is decreased by at least 5%; and
wherein the product is coated during washing.

17. The method of claim 16, further including at least one of a step of transporting and a step of storing the coated product in the transport system for a period of time.

18. The method of claim 16, further comprising a step of increasing the freight capacity of the transport system, wherein the transport system has a first freight capacity of the product prior to coating and a second freight capacity of the coated product, and wherein the second freight capacity is larger than the first freight capacity.

19. The method of claim 18, wherein the freight capacity of the system is the weight of the product, and wherein the second freight capacity is increased by at least 5% compared to the first freight capacity.

20. The method of claim 18, wherein the second freight capacity is increased by at least 15% compared to the first freight capacity.

21. The method of claim 18, wherein the freight capacity of the system is the volume utilization of the transport system, and wherein the second freight capacity is increased by at least 5% compared to the first freight capacity.

22. The method of claim 16, wherein the product is coated pre-harvest.

23. The method of claim 16, wherein the product is coated post-harvest.

24. The method of claim 16, wherein the product is coated during harvest.

25. The method of claim 24, wherein the product is coated by a harvester.

26. The method of claim 16, wherein the product is coated post-harvest.

27. The method of claim 16, wherein at least one of the performance variables of the product is selected from one of the following: color, structural integrity, respiration rate, microbial load, bounce back, taste, odor, temperature, insulative effect, and UV filtering effect.

28. The method of claim 16, wherein the product comprises one or more of spinach, kale, arugula, lettuce, spring mix, cilantro, broccoli, green onion, and parsley.

29. A method of increasing the performance of a transport system having a performance variable, wherein the transport system transports a product, stores a product, or both, and wherein the product is food, flowers or plants and comprises at least one of edible proteins, fruits, vegetables, nuts, seeds, pet food, animal feed, or combinations thereof, the method comprising:
coating at least part of the surface of the product, which is initially uncoated, with a substance to create a coated product, wherein the substance is selected from the group consisting of: silk fibroin, chitin, acetylated monoglycerides, shellac, starch, high fructose corn syrup, mayauba wax, maydelilla wax, beeswax, vegetable oil, paraffin oil, ethylenediaminetetraacetic acid, cellulose, pectin, alginate, chitosan, gum Arabic, soy protein, zein, casein, whey, and combinations thereof;

thereby increasing the performance of the transport system by improving at least one performance variable of the coated product compared to the uncoated product when the product is at least one of transported and stored in the transport system wherein the product is coated during washing and post-harvest.

* * * * *